(12) United States Patent
Karato

(10) Patent No.: US 6,521,733 B1
(45) Date of Patent: Feb. 18, 2003

(54) TAPERED AROMATIC-VINYL/CONJUGATED-DIENE COPOLYMER RUBBER, PROCESS FOR PRODUCING THE SAME AND RUBBER COMPOSITION

(75) Inventor: Takeshi Karato, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/048,970

(22) PCT Filed: Aug. 9, 2000

(86) PCT No.: PCT/JP00/05333
§ 371 (c)(1),
(2), (4) Date: Feb. 11, 2002

(87) PCT Pub. No.: WO01/10919
PCT Pub. Date: Feb. 15, 2001

(30) Foreign Application Priority Data

Aug. 9, 1999 (JP) ............................................. 11-225449
Aug. 9, 1999 (JP) ............................................. 11-225450

(51) Int. Cl.$^7$ ............................................. C08F 236/10
(52) U.S. Cl. ........................ 526/340; 526/87; 526/173; 526/180; 525/105; 525/237; 525/332.9; 524/575
(58) Field of Search .......................... 526/87, 173, 180, 526/340; 525/105, 237, 332.9; 524/575

(56) References Cited

U.S. PATENT DOCUMENTS 4,950,719 A * 8/1990 Oyama et al. .............. 525/212
5,241,008 A * 8/1993 Hall ........................... 525/314

FOREIGN PATENT DOCUMENTS

JP  61-291610  * 12/1986
JP  01-167346  *  7/1989

* cited by examiner

Primary Examiner—Fred Teskin
(74) Attorney, Agent, or Firm—Armstrong, Westerman & Hattori, LLP

(57) ABSTRACT

A tapered aromatic vinyl-conjugated diene copolymer rubber having a ratio $W_{0.6Mp}/W_{Mp}$ in the range of 0.65–0.9 or 1.1–1.3 wherein Mp is molecular weight of a copolymer molecule corresponding to the peak of a molecular weight distribution curve obtained by gel permeation chromatography, $W_{Mp}$ is a weight fraction of aromatic vinyl monomer units in the copolymer molecule having a molecular weight Mp, and $W_{0.6Mp}$ is a weight fraction of aromatic vinyl monomer units in a copolymer molecule having a molecular weight of Mp×0.6. A coupled tapered rubber comprised of a plurality of tapered copolymer molecules which are bound together at molecule terminal. A rubber composition comprising this tapered rubber or coupled tapered rubber and natural rubber or a synthetic rubber. This rubber composition exhibits reduced heat build-up, and high wet skid resistance, tensile strength and abrasion resistance.

18 Claims, No Drawings

TAPERED AROMATIC-VINYL/ CONJUGATED-DIENE COPOLYMER RUBBER, PROCESS FOR PRODUCING THE SAME AND RUBBER COMPOSITION

TECHNICAL FIELD

This invention relates to a tapered aromatic vinyl-conjugated diene copolymer rubber, a process for producing the copolymer rubber, and a rubber composition comprising the copolymer rubber. More particularly, it relates to a tapered aromatic vinyl-conjugated diene copolymer rubber which, when the tapered copolymer rubber is mixed with natural rubber or a synthetic rubber, gives a rubber material for tire exhibiting a reduced heat-build up and having excellent wet skid resistance, tensile strength and abrasion resistance; a process for producing the tapered copolymer rubber; and a rubber composition comprising the material for rubber.

BACKGROUND ART

A serious view has been taken for saving resources and cleaning up the environment, and thus, the reduction of fuel consumption of automobiles is severely required. For the reduction of fuel consumption, reduction of rolling resistance of tires is desired. The reduction of rolling resistance of tires is attained usually by using a rubber material capable of providing a rubber vulcanizate exhibiting a reduced heat build-up.

For enhancing safety of automobiles, tires having a reduced braking distance are required. To reduce the braking distance on a wet road, namely, to improve a wet skid braking property, a crosslinked rubber exhibiting an enhanced heat build-up is generally used.

To meet the contradictory requirements of reduction of rolling resistance and improvement of wet skid resistance, modified rubbers have been proposed, which include, for example, a modified rubber prepared by allowing a diene rubber molecule to react with a benzophenone compound (for example, Japanese Unexamined Patent Publication [hereinafter abbreviated to "JP-A"] No. S58-189203); and a modified rubber composition comprising a diene rubber having introduced therein a substituted amino group or an alkoxysilyl group, and silica as a reinforcing agent (for example, JP-A S64-22940, JP-A H9-151275, JP-A H9-151276, JP-A H9-208621, JP-A H9-227628 and JP-A H9-235324). However, these modified rubbers do not exhibit a balanced property between the reduced heat build up and the enhanced heat build up, namely, the contradictory requirements for reduced fuel consumption and wet skid braking property are not satisfied.

Further, to provide a rubber having good and balanced reduced fuel consumption and wet skid braking property, a styrene-butadiene copolymer rubber has been proposed wherein the content of styrene units varies continuously depending upon the molecular weight of a copolymer molecule (for example, JP-A S57-53511). It is to be noted, however, that the styrene-butadiene copolymer rubber is fundamentally a polyblend comprised of a plurality of copolymer rubbers. It is described in the patent publication that the styrene-butadiene copolymer rubber is made by a polymerization process comprising sequential polymerization steps wherein a fresh monomer mixture comprised of a polymerization initiator and monomers is added in each polymerization step. A polymerization mixture at each step in this polymerization process is a mixture comprising polymer molecules growing continually from the previous step and fresh polymer molecules growing afresh. Thus the resulting copolymer rubber is a polyblend comprised of a plurality of rubbers. Therefore copolymer rubbers having a constant quality are difficult to make, and alteration of quality of copolymer rubbers also is difficult. When a rubber composition comprising this styrene-butadiene copolymer and natural rubber is used as a material for tire, the resulting tire has good abrasion resistance and wet skid braking property, but does not satisfy a severe requirement for reduced fuel consumption.

A tapered styrene-butadiene copolymer rubber wherein the content of vinyl bond units in the butadiene units has been proposed as a rubber material exhibiting good compatibility with natural rubber and giving a mixture of the copolymer rubber with natural rubber which is used as rubber vibration isolator (JP-A H1-167346). However, the rubber composition comprising this copolymer rubber and natural rubber is characterized in that the temperature dispersion profile of the dissipation factor has a one-peak and the peak of the dissipation factor is positioned at the low temperature side relative to that of the copolymer rubber, and thus, the dissipation factor around 0° C. of the rubber composition is low. A tire made from the rubber composition has very poor wet skid resistance and is of no practical use.

DISCLOSURE OF THE INVENTION

An object of the present invention is to provide a tapered aromatic vinyl-conjugated diene copolymer rubber used as a material giving tires having reduced heat-build up, enhanced wet skid resistance, high tensile strength and good abrasion resistance.

Another object of the present invention is to provide a process for producing the above-mentioned tapered aromatic vinyl-conjugated diene copolymer rubber.

Still another object of the present invention is to provide a rubber composition comprising the above-mentioned tapered aromatic vinyl-conjugated diene copolymer rubber, which is useful as a material for tire.

The present inventor made an extensive research to obviate the problems of prior art and found that a tapered aromatic vinyl-conjugated diene copolymer rubber wherein the content of aromatic vinyl monomer units in a polymer molecule varies in a specific fashion has characteristics such that, when the copolymer rubber is mixed with natural rubber or a synthetic rubber, a part of polymer molecule of the copolymer rubber exhibits good compatibility but the remaining part does not exhibit compatibility with natural rubber or a synthetic rubber, and thus, the tapered copolymer rubber gives a rubber composition having reduced heat-build up, enhanced wet skid resistance, high tensile strength and good abrasion resistance. Based on this finding, the present invention has been completed.

Thus, in accordance with the present invention, there is provided a tapered aromatic vinyl-conjugated diene copolymer rubber characterized by a tapered copolymer comprising aromatic vinyl monomer units and conjugated diene monomer units, and having a ratio $W_{0.6Mp}/W_{Mp}$ in the range of from 0.65 to 0.9 or from 1.1 to 1.3 wherein Mp is molecular weight of a copolymer molecule corresponding to the peak of a molecular weight distribution curve obtained by gel permeation chromatography, $W_{Mp}$ is a weight fraction of aromatic vinyl monomer units in the copolymer molecule having a molecule weight Mp, and $W_{0.6Mp}$ is a weight fraction of aromatic vinyl monomer units in a copolymer molecule having a molecular weight of Mp×0.6.

In accordance with the present invention, there is further provided a process for producing a tapered aromatic vinyl-conjugated diene copolymer rubber wherein an aromatic vinyl monomer and a conjugated diene monomer are copolymerized while the composition of a monomer mixture comprising the aromatic vinyl monomer and the conjugated diene monomer is varied with a progress of polymerization, characterized in that the copolymerization is carried out by using an organic active metal as an initiator in the presence of a polar compound in a hydrocarbon medium, while, with a progress of polymerization, (i) the ratio of the aromatic vinyl monomer within the monomer mixture is increased so that a tapered copolymer having a ratio $W_{0.6Mp}/W_{Mp}$ in the range of from 0.65 to 0.9 is produced, or, (ii) the ratio of the aromatic vinyl monomer within the monomer mixture is decreased so that a tapered copolymer having a ratio $W_{0.6Mp}/W_{Mp}$ in the range of from 1.1 to 1.3 is produced, wherein Mp is molecular weight of a copolymer molecule corresponding to the peak of a molecular weight distribution curve obtained by gel permeation chromatography, $W_{Mp}$ is a weight fraction of aromatic vinyl monomer units in the copolymer molecule having a molecular weight Mp, and $W_{0.6Mp}$ is a weight fraction of aromatic vinyl monomer units in a copolymer molecule having a molecular weight of Mp×0.6.

In accordance with the present invention, there is further provided a rubber composition characterized by comprising the above-mentioned tapered aromatic vinyl-conjugated diene copolymer rubber and at least one kind of rubber selected from the group consisting of natural rubber and synthetic rubbers.

In accordance with the present invention, there is further provided a coupled type rubber comprised of a plurality of the above-mentioned tapered aromatic vinyl-conjugated diene copolymer rubbers wherein a copolymer chain terminal of each copolymer molecule is bound together.

BEST MODE FOR CARRYING OUT THE INVENTION (Tapered Aromatic Vinyl-Conjugated Diene Copolymer Rubber)

The tapered aromatic vinyl-conjugated diene copolymer rubber of the present invention is a tapered copolymer made by a polymerization process carried out in a manner such that the weight fraction of the monomer units constituting the copolymer varies continually from the initiation of polymerization to the end thereof. The tapered aromatic vinyl-conjugated diene copolymer rubber includes two types of tapered copolymers.

A first type tapered copolymer rubber (hereinafter referred to as "tapered rubber (a-1)" when appropriate) is a tapered aromatic vinyl-conjugated diene copolymer wherein the weight fraction of aromatic vinyl monomer units in a copolymer molecule increases continually from one end portion of polymer molecule formed at the initiation of polymerization toward the other end portion thereof formed at the end of polymerization, and characterized as having a ratio $W_{0.6Mp}/W_{Mp}$ in the range of from 0.65 to 0.9 wherein Mp is molecular weight of a copolymer molecule corresponding to the peak of a molecular weight distribution curve obtained by gel permeation chromatography, $W_{Mp}$ is a weight fraction of aromatic vinyl monomer units in the copolymer molecule having a molecular weight Mp, and $W_{0.6Mp}$ is a weight fraction of aromatic vinyl monomer units in a copolymer molecule having a molecular weight of Mp×0.6.

A second type tapered copolymer rubber (hereinafter referred to as "tapered rubber (a-2)" when appropriate) is a tapered aromatic vinyl-conjugated diene copolymer made by a process wherein the weight fraction of aromatic vinyl monomer units in a copolymer molecule decreases continually from one end portion of copolymer molecule formed at the initiation of polymerization toward the other end portion thereof formed at the end of polymerization, and characterized as having a ratio $W_{0.6Mp}/W_{Mp}$ in the range of from 1.1 to 1.3 wherein Mp, $W_{Mp}$ and $W_{0.6Mp}$ are as defined above.

The two types of tapered copolymer rubbers (a-1) and (a-2) are hereinafter referred to generically as "tapered rubber (a)" when appropriate.

By the phrase "the weight fraction of aromatic vinyl monomer units in a copolymer molecule increases or decreases continually from one end portion of copolymer molecule formed at the initiation of polymerization toward the other end portion thereof formed at the end of polymerization", we mean that the weight fraction of aromatic vinyl monomer units in a copolymer molecule increases or decreases gradually and continually in a plurality of portions of a copolymer molecule chain from one end portion formed at the initiation of polymerization toward the other end portion thereof formed at the end of polymerization. In other words, in a plurality of portions in a copolymer molecule of tapered rubber (a-1), the weight fraction of aromatic vinyl monomer units in a portion far from one end portion formed at the initiation of polymerization is larger than that in a portion close to one end portion formed at the initiation of polymerization. In a plurality of portions in a copolymer molecule of tapered rubber (a-2), the weight fraction of aromatic vinyl monomer units in a portion far from one end portion formed at the initiation of polymerization is larger than that in a portion close to one end portion formed at the initiation of polymerization. For example, in the case of tapered rubber (a-1), for comparison of the weight fraction of aromatic vinyl monomer units in a portion of copolymer molecule with that in another portion of copolymer molecule, each portion should preferably have a molecular weight of at least 2,000, more preferably at least 4,000 and especially preferably at least 10,000. If each portion has a too low molecular weight, the weight fraction of aromatic vinyl monomer units sometimes seemingly increases toward the other end portion.

In tapered rubber (a), the weight fraction of conjugated diene monomer units is such that the lower limit thereof is preferably 50% by weight, more preferably 60% and especially preferably 70% by weight, and the upper limit thereof is preferably 90% by weight, more preferably 88% and especially preferably 85% by weight. The weight fraction of aromatic vinyl monomer units is such that the lower limit thereof is preferably 10% by weight, more preferably 12% and especially preferably 15% by weight, and the upper limit thereof is preferably 50% by weight, more preferably 40% and especially preferably 30% by weight.

In tapered rubber (a), a portion having a large weight fraction of conjugated diene monomer units and a large content of vinyl bond units in the conjugated diene monomer units exhibits high compatibility with natural rubber or a synthetic rubber. In contrast, a portion having a small weight fraction of conjugated diene monomer units or a small content of vinyl bond units in the conjugated diene monomer units exhibits poor compatibility with natural rubber or a synthetic rubber. Therefore tapered rubber (a) has characteristics varying depending upon the particular proportion of portions having high compatibility with natural rubber or a synthetic rubber to portions having poor compatibility with natural rubber or a synthetic rubber. More specifically, when the proportion of portions having high compatibility with natural rubber or a synthetic rubber is too large and the proportion of portions having high compatibility with natural rubber or a synthetic rubber is too small, a rubber composition of the present invention tends to possess reduced wet skid resistance. In contrast, when the proportion of portions having high compatibility with natural rubber or a synthetic rubber is too small and the proportion of portions having high compatibility with natural rubber or a synthetic rubber is too large, a rubber composition of the present invention tends to possess a large heat build up, low tensile strength and poor abrasion resistance.

As specific examples of the conjugated diene monomer, there can be mentioned 1,3-butadiene, 2-methyl-1,3-butadiene, 2,3-dimethyl-1,3-butadiene, 2-chloro-1,3-butadiene and 1,3-pentadiene. Of these, 1,3-butadiene is especially preferable. These conjugated diene monomers may be used either alone or as a combination of at least two thereof.

In tapered rubber (a), the proportion of vinyl bond units in the conjugated diene monomer units, namely, the proportion of the sum of 1,2-vinyl bond units and 3,4-vinyl bond units in the total conjugated diene monomer units, may be either uniform over an entire copolymer molecule, or varied in a copolymer molecule. In general, the proportion of vinyl bond units in the conjugated diene monomer units decreases with an increase of the weight fraction of aromatic vinyl monomer units and elevation of polymerization temperature, and said proportion of vinyl bond units increases with an increase of amount of a polar compound, mentioned below.

In tapered rubber (a), the content of vinyl bond units in the conjugated diene monomer units is such that the lower limit thereof is preferably 50% by weight, more preferably 55% by weight and especially preferably 60% by weight, and the upper limit thereof is preferably 90% by weight, more preferably 85% by weight and especially preferably 80% by weight. When the content of vinyl bond units in the conjugated diene monomer units is too small, the tapered rubber is liable to have poor compatibility with natural rubber or a synthetic rubber, and the rubber composition tends to have large heat build-up, low tensile strength and poor abrasion resistance. In contrast, when the vinyl bond units content is too large, the tapered rubber occasionally difficult to prepare.

As specific examples of the aromatic vinyl monomer, there can be mentioned styrene, α-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene and monofluorostyrene. Of these, styrene is especially preferable. These aromatic vinyl monomers may be used either alone or as a combination of at least two thereof.

Among tapered rubber (a), tapered rubber (a-1) has a ratio $W_{0.6Mp}/W_{Mp}$ in a specific range wherein Mp is molecular weight of a copolymer molecule at the peak of a molecular weight distribution curve plotted according to gel permeation chromatography (GPC), $W_{Mp}$ is a weight fraction of aromatic vinyl monomer units in the copolymer molecule having a molecular weight Mp, and $W_{0.6Mp}$ is a weight fraction of aromatic vinyl monomer units in a copolymer molecule having a molecular weight of Mp×0.6. The ratio $W_{0.6Mp}/W_{Mp}$ is such that the lower limit thereof is 0.65, preferably 0.67 and more preferably 0.69, and the upper limit thereof is 0.9, preferably 0.85 and more preferably 0.8. If the ratio $W_{0.6Mp}/W_{Mp}$ is too small, a rubber composition of the present invention is liable to have poor wet skid resistance. In contrast, if this ratio is too large, a rubber composition of the present invention is liable to have large heat build-up, low tensile strength and poor abrasion resistance.

Most of the copolymer molecule having a molecular weight Mp×0.6 contained in tapered rubber (a) of the present invention are predominantly comprised of copolymers wherein an organic active metal bonded to the active end of polymer chain is deactivated for some reason or other. Comparison of the copolymer molecule having a molecular weight Mp×0.6 with a copolymer molecule having a molecular weight Mp can be a measure showing variation of the aromatic vinyl monomer units in tapered rubber (a).

The weight fraction $W_{Mp}$ and the weight fraction $W_{0.6Mp}$ can be determined, for example, by absorption intensity measured by a differential refractometer on eluted fractions corresponding to the respective molecular weights according to GPC, absorption intensity measured by a ultraviolet spectrometer on the eluted fractions or absorption intensity measured by an infrared spectrometer on the eluted fractions.

In tapered rubber (a) of the present invention, the weight fraction of aromatic vinyl monomer units increases or decreases continually from one end portion at the initiation of polymerization toward the other end portion. Tapered rubber (a) can be produced by controlling the amount of an aromatic vinyl monomer in a polymerization liquid depending upon the polymer production percentage so that a tapered rubber having the above-mentioned ratio $W_{0.6Mp}/W_{Mp}$ is produced.

In tapered rubber (a-1), the weight fraction of aromatic vinyl monomer units in a copolymer portion, produced for a duration in which a polymer production percentage varies from 0% to 40% by weight, is preferably not larger than 20% by weight, more preferably not larger than 15% by weight and especially preferably not larger than 13% by weight. The weight fraction of aromatic vinyl monomer units in a copolymer portion, produced for a duration in which a polymer production percentage varies from 50% by 60% by weight, is such that the lower limit thereof is preferably 18% by weight, more preferably 20% by weight and especially preferably 22% by weight, and the upper limit thereof is preferably 50% by weight, more preferably 45% by weight and especially preferably 40% by weight. The weight fraction of aromatic vinyl monomer units in a copolymer portion, produced for a duration in which a polymer production percentage varies from 70% to 100% by weight, is such that the lower limit thereof is preferably 25% by weight, more preferably 28% by weight and especially preferably 30% by weight, and the upper limit thereof is preferably 70% by weight, more preferably 60% by weight and especially preferably 55% by weight. By the term "polymer production percentage" used herein, we mean the percentage by weight of produced polymer based on the total weight of monomers used.

In tapered rubber (a-1), if the weight fraction of aromatic vinyl monomer units in a copolymer portion, produced for a duration in which a polymer production percentage varies from 0% to 40% by weight, is too large, the compatibility with natural rubber or a synthetic rubber tends to be reduced and consequently tensile strength and abrasion resistance are liable to become poor. If the weight fraction of aromatic vinyl monomer units in a copolymer portion, produced for a duration in which a polymer production percentage varies from 50% to 60% by weight, is too small, the compatibility with natural rubber or a synthetic rubber tends to be increased and consequently the wet skid resistance is liable to become poor. In contrast, if this weight fraction of aromatic vinyl monomer units in a copolymer portion produced during a polymer production percentage of from 50% to 60% by weight is too large, it becomes difficult to continually increase the proportion of aromatic vinyl monomer units, and the hardness of the rubber becomes large and the wed skid resistance is liable to become poor. If the weight fraction of aromatic vinyl monomer units in a copolymer portion, produced for a duration in which a polymer production percentage varies from 70% to 100% by weight, is too small, the compatibility with natural rubber or a synthetic rubber tends to be increased and the wet skid resistance is liable to become poor. In contrast, if this weight fraction of aromatic vinyl monomer units in a copolymer portion produced during a polymer production of from 70% to 100% by weight is too large, the heat build-up is liable to be increased.

In tapered rubber (a–2), the weight fraction of aromatic vinyl monomer units in a copolymer portion, produced for a duration in which a polymer production percentage varies from 0% to 30% by weight, is such that the lower limit thereof is preferably 25% by weight, more preferably 28% by weight and especially preferably 30% by weight, and the upper limit thereof is preferably 70% by weight, more preferably 60% by weight and especially preferably 55% by weight. The weight fraction of aromatic vinyl monomer units in a copolymer portion, produced for a duration in which a polymer production percentage varies from 40% to 50% by weight, is such that the lower limit thereof is preferably 18% by weight, more preferably 20% by weight and especially preferably 22% by weight, and the upper limit thereof is preferably 50% by weight, more preferably 45% by weight and especially preferably 40% by weight. The weight fraction of aromatic vinyl monomer units in a copolymer portion, produced for a duration in which a polymer production percentage varies from 60% to 100% by weight, is not larger than 20%, preferably not larger than 15% and especially preferably not larger than 13% by weight.

In tapered rubber (a–2), if the weight fraction of aromatic vinyl monomer units in a copolymer portion, produced for a duration in which a polymer production percentage varies from 0% to 30% by weight, is too small, the compatibility with natural rubber or a synthetic rubber tends to be increased and consequently the wet skid resistance is liable to become poor. In contrast, if this weight fraction of aromatic vinyl monomer units in a copolymer portion produced during a polymer production percentage of from 0% to 30% by weight is too large, the heat build-up is liable to be increased. If the weight fraction of aromatic vinyl monomer units in a copolymer portion, produced for a duration in which a polymer production percentage varies from 40% to 50% by weight, is too small, the compatibility with natural rubber or a synthetic rubber tends to be increased and consequently the wet skid resistance is liable to become poor. In contrast, if this weight fraction of aromatic vinyl monomer units in a copolymer portion produced during a polymer production percentage of from 40% to 50% by weight is too large, it becomes difficult to continually increase the proportion of aromatic vinyl monomer units, and the hardness of the rubber becomes large and the wed skid resistance is liable to become poor. If the weight fraction of aromatic vinyl monomer units in a copolymer portion, produced for a duration in which a polymer production percentage varies from 60% to 100% by weight, is too large, the compatibility with natural rubber or a synthetic rubber tends to be decreased and the tensile strength and abrasion resistance are liable to become poor.

In tapered rubber (a), the proportion of 1,4-bond units in the conjugated diene monomer units, namely, the proportion of the sum of 1,4-cis bond units and 1,4-trans bond units in the total conjugated diene monomer units, is preferably uniform or varied only to a minor extent in a copolymer molecule. More specifically, when the length of a copolymer molecule is divided into ten equal parts, and the proportion of 1,4-bond units in the conjugated diene monomer units in each of the ten parts is measured, the difference between the maximum proportion and the minimum proportion is preferably not larger than 25% by mole, more preferably not larger than 20% by mole and especially preferably not larger than 15% by mole. If this difference is too large, the crosslinking density distribution of a crosslinked rubber composition becomes non-uniform of a tensile strength and abrasion resistance are liable to be poor.

The molecular weight of tapered rubber (a) of the present invention is not particularly limited, but, the lower limit of the weight average molecular weight (Mw) as measured by gel permeation chromatography and expressed in terms of that of polystyrene is preferably 50,000, more preferably 100,000 and especially preferably 150,000, and the upper limit thereof is preferably 2,000,000, more preferably 1,500,000 and especially preferably 1,200,000. When the weight average molecular weight (Mw) is too small, a rubber composition of the present invention is liable to have large heat build-up, poor wet skid resistance, low tensile strength and poor abrasion resistance. In contrast, when Mw is too large, the rubber composition tends to have poor processability.

The molecular weight distribution (Mw/Mn) of tapered rubber (a) of the present invention, as expressed in terms of a ratio of the weight average molecular weigh (Mw) to the number average molecular weight (Mn), is such that the lower limit of Mw/Mn is preferably 1.05 and more preferably 1.1, and the upper limit thereof is preferably 3.5, more preferably 3 and especially preferably 2.5. When the molecular weight distribution (Mw/Mn) of tapered rubber (a) is too small, the processability and abrasion resistance are liable to be poor. In contrast, when Mw/Mn is too large, the heat build-up tends to become large and the tensile strength is liable to be reduced.

(Process for Producing Tapered Aromatic Vinyl-Conjugated Diene Copolymer Rubber)

Tapered rubber (a) of the present invention is produced by copolymerizing an aromatic vinyl monomer and a conjugated diene monomer while the composition of a monomer mixture comprising the aromatic vinyl monomer and the conjugated diene monomer is varied with a progress of polymerization. More specifically, for the production of tapered rubber (a–1), the copolymerization is carried out while the ratio of the aromatic vinyl monomer within the monomer mixture is increased with a progress of polymerization so that a tapered copolymer having a ratio $W_{0.6Mp}/W_{Mp}$ in the range of from 0.65 to 0.9 is produced. In contrast, for the production of tapered rubber (a–2), the copolymerization is carried out while the ratio of the aromatic vinyl monomer within the monomer mixture is decreased with a progress of polymerization so that a tapered copolymer having a ratio $W_{0.6Mp}/W_{Mp}$ in the range of from 1.1 to 1.3. Provided that the copolymerization is carried out while the composition of the monomer mixture is varied with a progress of polymerization so that a tapered copolymer having the specified ratio $W_{0.6Mp}/W_{Mp}$ is produced, the other polymerization conditions are not particularly limited. For example, the copolymerization can be carried out by using an organic active metal as an initiator in the presence of a polar compound in a hydrocarbon medium.

The hydrocarbon medium used in the polymerization process is selected from well known hydrocarbon mediums, and, as specific examples thereof, there can be mentioned aliphatic hydrocarbons such as n-butane, n-pentane, iso-pentane, n-hexane, n-heptane and iso-octane; alicyclic hydrocarbons such as cyclopentane, cyclohexane and methylcyclopentane; and aromatic hydrocarbons such as benzene and toluene. Of these, n-hexane, cyclohexane and toluene are preferable. If desired, unsaturated hydrocarbons having poor polymerizability, such as 1-butene, cis-2-butene and 2-hexene, may be used as the hydrocarbon medium. These hydrocarbon mediums may be used either alone or as a combination of at least two thereof.

As specific examples of the polar compound, there can be mentioned ether compound such as dibutyl ether, diamyl ether, tetrahydrofuran and ethylene glycol dibutyl ether; tertiary amines such as tetramethylethylenediamine, trimethylamine and pyridine; and alkali metal alkoxides and phosphine compounds.

As the organic active metal, organic alkali metals are preferably used. As specific examples of the organic alkali metal, there can be mentioned organic monolithium compounds such as n-butyllithium, sec-butyllithium, t-butyllithium, hexyllithium, phenyllithium and stilbenelithium; functional lithium compounds such as dilithiomethane, 1,4-dilithiobutane, 1,4-dilithio-2-ethylcyclohexane and 1,3,5-trilithiobenzene; and sodium naphthalene and potassium naphthalene. Of these, organic lithium compounds are preferable. Organic monolithium compounds are especially preferable. These organic alkali metals may be used either alone or as a combination of at least two thereof.

The amount of the hydrocarbon medium used is not particularly limited, but is preferably such that the concentration of monomer is in the range of 1% to 50% by weight. The amount of the organic active metal is appropriately chosen depending upon the molecular weight of required polymer, but is preferably in the range of 0.1 to 30 millimoles per 100 g of monomers.

The amount of the polar compound, per mole of the organic active metal used as an initiator, is such that the lower limit thereof is preferably 0.1 mole, more preferably 0.3 mole and especially preferably 0.5 mole, and the upper limit thereof is preferably 100 moles, more preferably 50 moles and especially preferably 30 moles. When the amount of the polar compound is too small, the proportion of vinyl bond units in the conjugated diene monomer units cannot be enhanced to a sufficiently high value, and a problem sometimes arises depending upon the use of rubber composition. When the amount of the polar compound is too large, the proportion of vinyl bond units is difficult to enhance.

The polymerization reaction is carried out preferably at a temperature of −78° C. to 150° C. in a batchwise or continuous manner. A batchwise polymerization is preferable. With a progress of polymerization, a monomer mixture is continuously or intermittently added to the polymerization mixture while the ratio of an aromatic vinyl monomer to a conjugated diene monomer is varied so that the weight fraction of aromatic vinyl monomer units is increased or decreased to form a tapered copolymer rubber (a), and aromatic vinyl monomer units are bonded randomly.

Tapered rubber (a) can be made into a terminal-modified tapered rubber by allowing a copolymer chain terminal having bonded thereto an organic active metal to react with a modifier. Tapered rubber (a) can also be made into a terminal-modified tapered rubber by conducting polymerization using an organic alkali metal amide as an initiator to thereby modify an initiation terminal of copolymer chain. With an increase of the degree of terminal modification, the effects of enhancement of wet grip property and reduction of the heat build-up become conspicuous. When a copolymer chain terminal having bonded thereto an organic active metal is allowed to react with a modifier, a polar group is introduced to the organic active metal bonded site of the copolymer chain.

The modifier used is preferably those which can introduce a tin or nitrogen atom into the copolymer chain. As specific examples of the tin atom-introducing modifier, there can be mentioned trimethylmonochlorotin and triphenylmonochlorotin. As specific examples of the nitrogen atom-introducing modifier, there can be mentioned N,N-di-substituted-aminoalkyl acrylate compounds and N,N-di-substituted-aminoalkyl methacrylate compounds, such as N,N-dimethylaminoethyl acryalte and N,N-dimethylaminoethyl methacryalte; N,N-di-substituted-aminoalkylacrylamide compounds and N,N-di-substituted-aminoalkylmethacrylamide compounds, such as N,N-dimethylaminopropylacrylamide and N,N-dimethylaminopropylmethacrylamide; N,N-di-substituted-aminoaromatic vinyl compounds such as N,N-di-substituted aminostyrene derivatives, for example, N,N-dimethylaminoethylstyrene, and vinyl compounds having a pyridyl group; N-substituted cyclic amides such as N-methyl-2-pyrrolidone, N-vinyl-2-pyrrolidone, N-phenyl-2-pyrrolidone and N-methyl-ε-caprolactam; N-substituted cyclic ureas such as 1,3-dimethylethyleneurea and 1,3-diethyl-2-imidazolidinone; N-substituted-aminoketones such as 4,4'-bis(dimethylamino)benzophenone and 4,4'-bis(diethylamino)benzophenone; N-substituted-aminoaldehydes such as 4-N,N-dimethylaminobenzaldehyde; N-substituted carbodiimides such as dicyclohexylcarbodiimide; Schiff bases such as N-ethylethylideneimine and N-methylbenzylideneimine; and aromatic isocyanates such as 2,4-tolylene diisocyanate, and polymerized products thereof. Of these, N,N-di-substituted-aminoaromatic vinyl compounds, N-substituted cyclic amides and N-substituted-aminoketones are preferable. N,N-dimethylaminoethylstyrene, N-phenyl-2-pyrrolidone and 4,4'-bis(diethylamino)benzophenone are especially preferable.

The amount of the modifier used is appropriately chosen depending upon the particular properties required for the conjugated diene rubber, and is preferably in the range of 0.1 to 50 equivalents based on the organic active metal.

After a copolymer chain is modified with the above-mentioned modifier, when the terminal-modified copolymer chain is polymerizable with a monomer, the monomer may be added to carry out a further polymerization of the copolymer chain.

After modification, the modified copolymer may be further subjected to a modification treatment. For example, when the modified copolymer chain has a tertiary amino group introduced therein, the copolymer chain may be treated with a quaternizing agent to thereby convert the tertiary amino group to a quaternary amino group. As specific examples of the quaternizing agent, there can be mentioned an alkyl nitrate, a potassium alkylsulfate, a dialkylsulfuric acid, an alkyl arylsulfonate, an alkyl halide and a metal halide.

The reaction temperature and time can be chosen in a broad range and are preferably in the ranges of 15° C. to 120° C. and 1 second to 10 hours, respectively. The degree of modification as defined by a ratio of a terminal-modified copolymer molecule to the total copolymer is preferably in the range of 10 to 100% by weight. The degree of modification can be determined by calculating a ratio (UV/RI) of an absorption intensity (UV) measured by an ultraviolet spectrophotometer to a differential refractive index (RI) measured by a differential refractometer according to GPC, and calibrating the ratio by using a previously prepared calibration curve.

After completion of the polymerization, or completion of the modification following polymerization, to deactivate and remove the organic active metal bound to a polymer chain terminal, a polymerization stopper is added to the polymerization liquid to stop the polymerization. The polymerization stopper includes, for example, alcohols such as methanol and ethanol. The amount of polymerization stopper is such that the lower limit thereof is preferably 1 equivalent, more preferably 1.5 equivalents and especially preferably 2 equivalents, and the upper limit thereof is preferably 50 equivalents, more preferably 20 equivalents and especially preferably 10 equivalents, based on the organic active metal. When the amount of polymerization stopper is too small, the polymerization does not completely stop and the resulting tapered rubber is liable to possess poor stability. An excessive amount of stopper is not necessary because the polymerization can substantially be stopped.

After completion of stopping the polymerization, ingredients may be incorporated in the polymerization liquid according to the need. When the polymer is heated in subsequent steps of, for example, solvent removal or drying, an antioxidant is preferably incorporated in this step. The antioxidant includes, for example, a phenolic stabilizer, a phosphorus-containing stabilizer and a sulfur-containing stabilizer. The amount of antioxidant can be determined depending upon the particular kind of antioxidant.

Tapered rubber (a) may be an oil-extended rubber prepared by adding a process oil to the polymerization liquid.

The method by which tapered rubber (a) is recovered is not particularly limited. As specific examples of the rubber-recovering method, a direct drying method of drying a polymerization liquid by, for example, heating to remove a liquid medium; a method of pouring a polymerization liquid in a poor solvent to precipitate a polymer rubber, recovering the rubber by, for example, filtration, and drying the rubber to remove the solvent; and a stream-stripping method of blowing high-temperature steam into a polymerization liquid to remove a liquid medium and simultaneously precipitate a crumb-like rubber in water condensed from steam, and recovering the rubber by, for example, by filtration, followed by drying to remove water. When impurities such as a metal residue cannot be sufficiently removed by these methods, a procedure of dissolving the recovered rubber in a good solvent and then pouring the rubber solution in a poor solvent to precipitate the rubber may be repeated.

(Coupled Tapered Rubber)

The tapered aromatic vinyl-conjugated diene copolymer rubber of the present invention may be a coupled rubber (hereinafter referred to as "coupled rubber (b)" when appropriate) comprised of a plurality of tapered aromatic vinyl-conjugated diene copolymer molecules wherein a polymer chain terminal of each copolymer molecule is bound together.

Coupled tapered rubber (b) is made by a method wherein a copolymer chain terminal bound to an organic active metal in a polymerization liquid is allowed to react with a coupling agent before the step of stopping the polymerization in the process for producing tapered rubber (a). By the reaction of each copolymer chain terminal with a coupling agent, a plurality of copolymer chains are bound together at each terminal having an organic active metal bound thereto through the coupling agent to form a coupled tapered rubber (b).

The coupling agent used is not particularly limited provided that coupled tapered rubber (b) is produced. As specific examples of the coupling agent, there can be mentioned tin-containing coupling agents such as tin tetrachloride and dimethyltin dichloride; silicon-containing coupling agents tetramethoxysilane, tetraethoxysilane and tetrapropoxysilane; unsaturated nitrile coupling agents; ester coupling agents; halide coupling agents; phosphorus-containing coupling agent; and tetraglycidyl-1,3-bisaminomethylcyclohexane.

The amount of coupling agent is appropriately determined depending upon the required weight average molecular weight, coupling percentage and reactivity of coupling agent, but is preferably in the range of 0.1 to 10 equivalents based on the organic active metal. The coupling is carried out preferably at a temperature of 0° C. to 150° C. for 1.5 to 20 hours. The coupling percentage can be appropriately chosen, but is preferably in the range of 10 to 100%. The coupling percentage, i.e., the percentage by weight of the coupled polymer to the total polymer, can be determined from a curve prepared by measurement using a differential refractometer according to GPC. That is, the ratio (A/A+B) of area (A) of the peak of curve occurring at a higher molecular weight side than that of peak (B), mentioned below, in the curve prepared after coupling, to the sum of area (A) plus area (B) of a peak occurring at the same position as that of a peak occurring in a curve prepared before coupling.

Stopping of the coupling reaction can be carried out by employing the same kind and amount of polymerization stopper. The kind and amount of ingredients to be incorporated in coupled tapered rubber (b) and the procedure for recovering coupled tapered rubber (b) may be the same as those employed for the above-mentioned tapered rubber (a).

(Rubber Composition)

The rubber composition of the present invention comprises at least one rubber selected from tapered rubber (a) and coupled tapered rubber (b), and at least one rubber selected from natural rubber and synthetic rubbers.

The amount of tapered rubber (a) and/or coupled rubber (b) in the rubber composition, i.e., the ratio of [(tapered rubber (a) and/or coupled rubber (b)] to the sum of [tapered rubber (a) and/or coupled rubber (b)] plus [natural rubber and/or synthetic rubber], is such that the lower limit thereof is usually 10% by weight, preferably 20% by weight and especially preferably 40% by weight, and the upper limit thereof is usually 90% by weight, preferably 85% by weight and especially preferably 80% by weight. When the amount of tapered rubber (a) and/or coupled rubber (b) is too small, the abrasion resistance and heat build-up are not satisfactory. In contrast, when the amount of tapered amount rubber (a) and/or coupled rubber (b) is too large, the production conditions become difficult to control.

The rubber composition of the present invention may further comprise other rubber (c) in addition to tapered rubber (a) and/or coupled rubber (b), provided that the object and effect of the present invention can be attained. As specific examples of rubber (c), there can be mentioned diene rubber, styrene-butadiene rubber copolymer rubber and styrene-isoprene-butadiene copolymer rubber. These rubbers (c) may be used either alone or as a combination of at least two thereof.

The amount of rubber (c) is preferably not larger than 80% by weight, more preferably not larger than 70% by weight and especially preferably not larger than 60% by weight, based on the total amount of rubbers contained in the rubber composition. When the amount of rubber (c) is too large, the heat build-up, wet skid resistance, tensile strength and abrasion resistance tend to become unsatisfactory.

When the rubber composition is used for a material for tire, a reinforcing agent is preferably incorporated in the rubber composition. The reinforcing agent includes, for example, silica, carbon black and a silica/carbon black composite. These reinforcing agents may be used either alone or in combination. When silica is used as a reinforcing agent, the effect of reduction of heat build-up and improvement of abrasion resistance can be enhanced by incorporation of a silane coupling agent.

As specific examples of the carbon black, there can be mentioned furnace black, acetylene black, thermal black, channel block and graphite. The carbon black may be used either alone or in combination. Of these, furnace black is especially preferable. The amount of reinforcing agent is such that the lower limit thereof is preferably 10 parts by weight, more preferably 20 parts by weight and especially preferably 30 parts by weight, and the upper limit is preferably 200 parts by weight, more preferably 150 parts by weight and especially preferably 120 parts by weight, based on 100 parts by weight of the rubber ingredients.

Ingredients other than the above-described ingredients may be incorporated in an appropriate amount in the rubber composition of the invention according to the need. Such ingredients include, for example, a crosslinking agent, a crosslinking accelerator, a crosslinking promoter, an antioxidant, an activator, a plasticizer, a lubricant and a reinforcing agent.

The crosslinking agent is not particularly limited provided that it is used for crosslinking rubber, and, as specific examples thereof, there can be mentioned sulfur such as powdery sulfur, precipitated sulfur, colloidal sulfur, insoluble sulfur and highly dispersible sulfur; organic peroxides such as dicumyl peroxide and di-t-butyl peroxide; and organic polyamines such as triethylenetetraamine and hexamethylenediamine carbamate. Of these, sulfur is preferable. Powdery sulfur is especially preferable.

The amount of the crosslinking agent is such that the lower limit thereof is preferably 0.1 part by weight, more preferably 0.3 part by weight and especially preferably 0.5 parts by weight, and the upper limit thereof is preferably 15 parts by weight, more preferably 10 parts by weight and especially preferably 5 parts by weight, based on 100 parts by weight of the rubber ingredients. When the amount of crosslinking agent is too small, the heat build-up, tensile strength and abrasion resistance are liable to be unsatisfactory. In contrast, when the amount of crosslinking agent is too large, the wet skid resistance and abrasion resistance sometimes become poor.

As specific examples of the crosslinking accelerator, there can be mentioned sulfenamide crosslinking accelerators such as N-cyclohexyl-2-benzothiazolesulfenamide, N-t-butyl-2-benzothiazolesulfenamide and N-oxyethylene-2-benzothiazole-sulfenamide; guanidine crosslinking accelerators such as diphenylguanidine and diorthotolylguanidine; thiourea crosslinking accelerators such as diethylthiourea; thiazole crosslinking accelerators such as 2-mercaptobenzothiazole and dibenzothiazyl disulfideazole; thiuram crosslinking accelerators such as tetramethylthiuram monosulfide and tetramethylthiuram disulfide; dithiocarbamate crosslinking accelerators such as sodium dimethyldithiocarbamate and zinc diethyldithiocarbamate; and xanthogenate crosslinking accelerators such as sodium isopropylxanthogenate and zinc isopropylxanthogenate.

The amount of crosslinking accelerators is such that the lower limit thereof is preferably 0.1 part by weight, more preferably 0.3 part by weight and especially preferably 0.5 part by weight, and the upper limit thereof is preferably 15 parts by weight, more preferably 10 parts by weight and especially preferably 5 parts by weight, based on 100 parts by weight of the rubber ingredient.

The crosslinking promoter is not particularly limited provided that it is used for crosslinking rubber, and includes, for example, higher fatty acids such as stearic acid, and zinc oxide. The amount of the crosslinking promoter is appropriately chosen depending upon the particular kind of crosslinking promoter.

The other ingredients are also not particularly limited provided that they are used for rubber, and as examples of the other components, there can be mentioned activators such as diethylene glycol, polyethylene glycol and silicone oil; fillers such as calcium carbonate, talc and clay; and process oil and wax.

The rubber composition of the invention can be prepared by mixing or kneading together the respective ingredients. For example, rubber ingredients other than a crosslinking agent and a crosslinking accelerator are kneaded together with the crosslinking agent and the crosslinking accelerator to obtain a rubber composition. The temperature at which the kneading is completed is such that the lower limit thereof is preferably 80° C., more preferably 90° C. and especially preferably 100° C., and the upper limit thereof is preferably 200° C., more preferably 190° C. and especially preferably 180° C. The kneading time is such that the lower limit is preferably 30 seconds and more preferably 1 minute, and the upper limit is preferably 30 minutes. If the kneading temperature is too high, the rubber composition is sometimes burnt during kneading. In contrast, if the kneading temperature is too low, uniform mixing of rubber with ingredients becomes difficult and the heat build-up and abrasion resistance are liable to be unsatisfactory. If the kneading time is too short, uniform mixing of rubber with ingredients becomes difficult and the heat build-up and abrasion resistance are liable to be unsatisfactory. In contrast, if the kneading time is too long, the rubber composition is sometimes burnt during kneading. Even if the kneading time is too long, uniform mixing of rubber with ingredients cannot be enhanced.

The incorporation of a crosslinking agent and a crosslinking accelerator is preferably carried out after the rubber composition is cooled to a temperature of preferably 120° C. or lower, and more preferably 80° C. or lower. If the incorporation temperature is too high, crosslinking commences to occur at the incorporation and a problem arises in processability. Consequently, the intended crosslinked rubber article is difficult to obtain.

After a crosslinking agent and a crosslinking accelerator are incorporated, crosslinking occurs in the rubber composition of the present invention. The crosslinking temperature is such that the lower limit is preferably 120° C. and more preferably 140° C. and the upper limit is preferably 200° C. and more preferably 180° C.

The invention will now be specifically described by the following working examples including production examples, examples and comparative examples. Parts in these working examples are by weight The properties of copolymers and rubbers were evaluated by the following methods.
(1) Bound Styrene Content The content of bound styrene in a copolymer rubber was determined according to JIK K6383 (a refractive index method).

the content of bound styrene in a portion of a polymer chain was calculated from (i) a polymer production percentage as measured on a sample of polymerization liquid taken during polymerization, and (ii) a weight fraction of styrene units in a polymer chain.

The ratio ($W_{0.6Mp}/W_{Mp}$) of a weight fraction ($W_{0.6Mp}$) of styrene units in a copolymer molecule having a molecular weight of Mp×0.6 to a weight fraction ($W_{Mp}$) of styrene units in a copolymer molecule having a molecular weight of Mp (wherein Mp was determined by calculating the value of a ratio ($UV/RI_{0.6Mp}/UV/RI_{Mp}$) wherein UV/RI is an absorption intensity ratio of an absorption intensity (UV) measured by a ultraviolet spectrometer [UV-8020 available from Tosoh Corporation] on eluted fractions in gel permeation chromatography (GPC) to an absorption intensity (RI) measured by a differential refractometer [RI-8020 available from Tosoh Corporation] on eluted fractions in GPC. $UV/RI_{0.6Mp}$ and $UV/RI_{Mp}$ are absorption intensity ratios UV/RI as measured on a copolymer molecule having a molecular weight of Mp×0.6 and a copolymer molecule having a molecular weight of Mp, respectively. In GPC measurement, two columns [GMH-HR-H available from Tosoh Corporation] connected in series were used, and the molecular weight was expressed in terms of that of standard polystyrene.

(2) Difference in 1,4-Bond Units Content

The difference between the maximum value and the minimum value in 1,4-bond units content was determined from (i) a polymer production percentage as measured on a sample of polymerization liquid taken during polymerization, and (iii) a 1,4-bond units content in a copolymer molecule in a polymerization liquid as measured by $^1$H-NMR analysis (5.4–5.6 ppm). A copolymer molecule was divided into ten portions having an equal weight along the length thereof. 1,4-Bond units content in each of the ten portions was measured, and the difference between the maximum value and the minimum value in 1,4-bond units content was calculated.

(3) Vinyl Bond Units Content in Butadiene Units of Polymer

The vinyl bond units content in butadiene units of a copolymer was measured by infrared spectrophotometric analysis (Hampton method).

(4) Weight Average Molecular Weight (Mw) and Number Average Molecular Weight (Mn)

Measurement of molecular weight was carried out according to gel permeation chromatography (GPC) by using a differential refractometer RI-8020 available from Tosoh Corporation. Weight average molecular weight (Mw) and number average molecular weight (Mn) were expressed in terms of that of standard polystyrene. Gel permeation chromatogram HLC-8020 available from Tosoh Corporation was used. Two columns [GMH-HR-H available from Tosoh Corporation] connected in series were used. Molecular weight distribution (Mw/Mn) was calculated.

(5) Tensile Strength as 300% Modulus

300% Modulus was determined according to JIS K6301. The measured 300% modulus was expressed as an index number which was a relative value as the value obtained in a comparative example was 100. The larger the 300% modulus, the more preferable the rubber.

(6) Heat Build-Up

Tan δ was measured at a twist of 0.5%, a frequency of 20 Hz and a temperature of 60° C. by using "RDA-II" available from Rheometrics Co. The heat build-up was expressed as an index number, i.e., a relative value as the value obtained in a comparative example was 100. The larger the tan δ value, the more preferable the rubber.

(7) Wet Skid Resistance

Tan δ was measured at a twist of 0.5%, a frequency of 20 Hz and a temperature of 0° C. by using "RDA-II" available from Rheometrics Co. The wet skid resistance was expressed as an index number of heat build-up, i.e., a relative value as the value obtained in a comparative example was 100. The larger the tan δ value, the more preferable the rubber.

(8) Abrasion Resistance

Abrasion resistance was measured by using Lambourn abrasion tester according to JIS-K6264. The abrasion resistance was expressed as an index number, i.e., a relative value as the value obtained in a comparative example was 100. The larger the index number, the more preferable the rubber.

EXAMPLE 1

An autoclave equipped with a stirrer was charged with 4,000 g of cyclohexane, 300 g of 1,3-butadiene and 12 milli-mol of tetramethylethylenediamine. The temperature was elevated to 40° C. and then 7.8 milli-mol of n-butyllithium was added to initiate polymerization. When 10 minutes elapsed from the commencement of polymerization, a mixture of 35 g of styrene and 265 g of 1,3-butadiene was continuously added at a constant rate over a period of 15 minutes. When 25 minutes elapsed from the commencement of polymerization, a mixture of 140 g of styrene and 210 g of 1,3-butadiene was continuously added at a constant rate over a period of 40 minutes. Further, when 65 minutes elapsed from the commencement of polymerization, a mixture of 25 g of styrene and 25 g of 1,3-butadiene was continuously added at a constant rate over a period of 10 minutes. During polymerization, an extremely minor amount of a polymerization liquid was taken from the autoclave at every 5 minutes to measure a polymer production percentage and a weight fraction of styrene units in a copolymer at that time. After it was confirmed that the conversion reached 100%, 12 milli-mol of methanol was added as a polymerization stopper to a polymerization liquid. The highest temperature reached during polymerization was 60° C.

To the polymerization liquid having the polymerization stopper added thereto, 0.15 part of 2,4-bis(n-octylthiomethyl)-6-methylphenol was added per 100 parts of rubber contained in the polymerization liquid. A polymer was recovered by steam stripping, dehydrated by rolls and then dried by a hot air dryer to give "rubber A". Water having added thereto 30 ppm of polyoxyethylene-polyoxypropylene ether was used as water in a stripping zone. The stripping was carried out so that the concentration of crumb-like diene polymer rubber in the water in stripping zone was 5% by weight.

As for rubber A, ratio of $W_{0.6Mp}/W_{Mp}$ was determined. Weight fraction of styrene units and vinyl bond units content in butadiene units were determined on each of portions of copolymer produced for a duration in which a polymer production percentage varied from 0% by weight to 40% by weight, from 50% by weight to 60% by weight, and from 70% by weight to 100% by weight, respectively. Further, difference in 1,4-bond units contents, average weight fraction of styrene units in total polymer, average vinyl bond unit content in butadiene units, Mp, weight average molecular weight (Mw), and molecular weight distribution (Mw/Mn) were determined. The results are shown in Table 1.

COMPARATIVE EXAMPLE 1

An autoclave equipped with a stirrer was charged with 4,000 g of cyclohexane, 450 g of 1,3-butadiene and 12 milli-mol of tetramethylethylenediamine. Then 8.5 milli-mol of n-butyllithium was added to initiate polymerization at 40° C. From the commencement of polymerization, a mixture of 75 g of styrene and 275 g of 1,3-butadiene was continuously added at a constant rate over a period of 30 minutes. When 30 minutes elapsed from the commencement of polymerization, a mixture of 75 g of styrene and 75 g of 1,3-butadiene was continuously added at a constant rate over a period of 15 minutes. Further, when 45 minutes elapsed from the commencement of polymerization, 50 g of styrene was continuously added at a constant rate over a period of 15 minutes. After it was confirmed that the conversion reached 100%, 12 milli-mol of methanol was added as a polymerization stopper to the polymerization liquid. The highest temperature reached during polymerization was 60° C.

By the same procedure as described in Example 1, "rubber B" was obtained from the polymerization liquid having the polymerization stopper added thereto. During polymerization, an extremely minor amount of a polymerization liquid was taken from the autoclave at every 5 minutes to evaluate the properties of a copolymer in the same manner as in Example 1. The results are shown in Table 1.

COMPARATIVE EXAMPLE 2

An autoclave equipped with a stirrer was charged with 4,000 g of cyclohexane, 150 g of styrene, 450 g of 1,3-butadiene and 12 milli-mol of tetramethylethylenediamine. Then 9.5 milli-mol of n-butyllithium was added to initiate polymerization at 40° C. When 10 minutes elapsed from the commencement of polymerization, a mixture of 50 g of styrene and 350 g of 1,3-butadiene was continuously added at a constant rate over a period of 50 minutes. After it was confirmed that the conversion reached 100%, 12 milli-mol of methanol was added as a polymerization stopper to a polymerization liquid. The highest temperature reached during polymerization was 60° C.

By the same procedures as described in Example 1, "rubber C" was obtained from the polymerization liquid having the polymerization stopper added thereto. During polymerization, an extremely minor amount of a polymerization liquid was taken from the autoclave at every 5 minutes to evaluate the properties of a copolymer in the same manner as in Example 1. The results are shown in Table 1.

EXAMPLE 2

By the same procedure as described in Example 1, polymerization was carried out. After it was confirmed that the conversion reached 100%, an extreme amount of a polymerization liquid was taken as a sample. 20 g of 1,3-butadiene was added to the remainder, and further 0.45 milli-mol of tin tetrachloride was added to carry out a reaction for 15 minutes. Then 4.5 milli-mol of N-phenyl-2-pyrrolidone was added to carry out a reaction for 10 minutes. Then 12 milli-mol of methanol was added as a polymerization stopper to a polymerization liquid. The highest temperature reached during polymerization was 60° C.

By the same procedures as described in Example 1, "rubber D1" was obtained from the polymerization liquid having the polymerization stopper added thereto. Further rubber d1 was recovered from a sample taken from a polymerization liquid as the conversion reached 100%.

During polymerization, an extremely minor amount of a polymerization liquid was taken from the autoclave at every 5 minutes to evaluate the properties of rubber d1 in the same manner as in Example 1. The results are shown in Table 1. Coupling percentage of rubber D1 is also shown in Table 1.

EXAMPLE 3

The procedures employed in Example 2 were repeated wherein 4,4'-bis(N,N-diethylamino)benzophenone was used instead of N-phenyl-2-pyrrolidone with all other conditions remaining the same. Thus, "rubber d2" and "rubber D2" were obtained instead of rubber d1 and rubber D1, respectively. The properties of rubber d2 and rubber D2 were evaluated. The results are shown in Table 1.

EXAMPLE 4

The procedures employed in Example 2 were repeated wherein the amount of tetramethylethylenediamine was changed to 6.3 milli-mol and N,N-dimethylaminostyrene was used instead of N-phenyl-2-pyrrolidone with all other conditions remaining the same. Thus, "rubber e" and "rubber E" were obtained instead of rubber d1 and rubber D1, respectively. The properties of rubber d2 and rubber D2 were evaluated. The results are shown in Table 1.

COMPARATIVE EXAMPLE 3

By the same procedures as employed in Comparative Example 1, polymerization was carried out. By the same procedures as employed in Example 2, modification reaction was carried out wherein N-methyl-ε-caprolactam was used instead of N-phenyl-2-pyrrolidone with all other conditions remaining the same. Thus, "rubber f" and "rubber F" were obtained instead of rubber d1 and rubber D1, respectively.

During polymerization, an extremely minor amount of polymerization liquid was taken from the autoclave at every 5 minutes to evaluate the properties of rubber f in the same manner as in Example 1. The results are shown in Table 1. Coupling percentage of rubber F is also shown in Table 1.

COMPARATIVE EXAMPLE 4

By the same procedures as employed in Comparative Example 2, polymerization was carried out. By the same procedures as employed in Example 2, modification reaction was carried out wherein N-methyl-ε-caprolactam was used instead of N-phenyl-2-pyrrolidone with all other conditions remaining the same. Thus, "rubber g" and "rubber G" were obtained instead of rubber d1 and rubber D1, respectively.

During polymerization, an extremely minor amount of polymerization liquid was taken from the autoclave at every 5 minutes to evaluate the properties of rubber g in the same manner as in Example 1. The results are shown in Table 1. Coupling percentage of rubber G is also shown in Table 1.

COMPARATIVE EXAMPLE 5

An autoclave equipped with a stirrer was charged with 4,000 g of cyclohexane, 170 g of styrene, 430 g of 1,3-butadiene and 12 milli-mol of tetramethylethylenediamine. The temperature was elevated to 40° C. and then 7.8 milli-mol of n-butyllithium was added to initiate polymerization. When 15 minutes elapsed from the commencement of polymerization, a mixture of 80 g of styrene and 320 g of 1,3-butadiene was continuously added at a constant rate over a period of 50 minutes. During polymerization, an extremely minor amount of a polymerization liquid was taken from the autoclave at every 5 minutes to measure a polymer production percentage and a weight fraction of styrene units in a copolymer at that time. After it was confirmed that the conversion reached 100%, 5 g of 1,3-butadiene was added and then 0.5 mili-mol of tin tetrachloride was added to carry out a reaction for 15 minutes. Then 12 milli-mol of methanol was added as a stopper to obtain a polymerization liquid "h11" having a stopper introduced therein. The highest temperature reached during polymerization was 70° C.

An autoclave equipped with a stirrer was charged with 4,000 g of cyclohexane, 100 g of styrene, 500 g of 1,3-butadiene and 10 milli-mol of tetramethylethylenediamine. The temperature was elevated to 40° C. and then 12.0 milli-mol of n-butyllithium was added to initiate polymerization at 40° C. When 10 minutes elapsed from the commencement of polymerization, a mixture of 50 g of styrene and 350 g of 1,3-butadiene was continuously added at a constant rate over a period of 30 minutes. During polymerization, an extremely minor amount of a polymerization liquid was taken from the autoclave at every 5 minutes to measure a polymer production percentage and a weight fraction of styrene units in a copolymer at that time. After it was confirmed that the conversion reached 100%, 20 milli-mol of methanol was added as a polymerization stopper to obtain a polymerization liquid "hb12" having a stopper introduced therein. The highest temperature reached during polymerization was 70° C.

Polymerization liquid h11 and polymerization liquid h12 were mixed together at a ratio of 6:4 by weight. By the same procedures as those described in Example 1, "rubber H" was taken from the mixed polymerization liquid. Similarly, "rubber h1" was recovered from a sample taken from polymerization liquid h11 at a polymerization conversion of 100%. "Rubber H1" was recovered from polymerization liquid h11 having been subjected to a coupling treatment and having a stopper introduced therein. "Rubber h2" was recovered from a sample taken from polymerization liquid h12 at a polymerization conversion of 100%.

The properties of rubber h1, rubber h2, rubber H1 and rubber H were evaluated in the same manner as described in Example 1. The results are shown in Table 1. The value of $W_{0.6Mp}/W_{Mp}$ of rubber H in Table 1 was determined as follows. Coupled copolymer molecules in rubber H was detected by a multiple light scattering detector, based on the absolute molecular weight and molecule size. The measurement of $W_{0.6Mp}$ and $M_{Mp}$ was made only on the portion other than the coupled copolymer molecules, i.e., on copolymer molecules having a straight chain structure.

EXAMPLE 5

An autoclave equipped with a stirrer was charged with 4,000 g of cyclohexane, 300 g of 1,3-butadiene was 12 milli-mol of tetramethylethylenediamine. Then 5.8 milli-mol of n-butyllithium was added to initiate polymerization at 40° C. When 15 minutes elapsed from the commencement of polymerization, a mixture of 35 g of styrene and 265 g of 1,3-butadiene was continuously added at a constant rate over a period of 25 minutes. When 40 minutes elapsed from the commencement of polymerization, a mixture of 140 g of styrene and 210 g of 1,3-butadiene was continuously added at a constant rate over a period of 60 minutes. Further, when 100 minutes elapsed from the commencement of polymerization, a mixture of 25 g of styrene and 25 g of 1,3-butadiene was continuously added at a constant rate over a period of 10 minutes. After it was confirmed that the conversion reached 100%, 5 g of 1,3-butadiene was added and then 0.54 mmili-mol of tetramethoxysilane was added to carry out a reaction for 30 minutes. Further, 2.0 milli-mol of N,N-dimethylaminoethylstyrene was added to carry out a reaction for 20 minutes. Finally 10 milli-mol of methanol was added as a stopper to obtain a polymerization liquid having a stopper introduced therein. The highest temperature reached during polymerization was 60° C.

To the polymerization liquid having the polymerization stopper added thereto, 0.2 part of 2,4-bis(n-octylthiomethyl)-6-methylphenol and 37.5 parts of process oil (ENERTHENE 1849-A, available from British Petroleum Co.) were added per 100 parts of rubber contained in the polymerization liquid. A rubber was recovered by steam stripping, dehydrated by rolls and then dried by a hot air dryer to give "rubber I". Water having added thereto 40 ppm of polyoxyethylene-polyoxypropylene ether was used as water in a stripping zone. The stripping was carried out so that the concentration of crumb-like oil-extended diene polymer rubber in the water in stripping zone was 5% by weight. "Rubber i" was recovered from a sample taken from a polymerization liquid at a conversion of 100%.

During polymerization, an extremely minor amount of polymerization liquid was taken from the autoclave at every 5 minutes to evaluate the properties of rubber i in the same manner as in Example 1. The results are shown in Table 1. Coupling percentage of rubber I is also shown in Table 1.

COMPARATIVE EXAMPLE 6

An autoclave equipped with a stirrer was charged with 4,000 g of cyclohexane, 450 g of 1,3-butadiene and 12 milli-mol of tetramethylethylenediamine. Then 5.0 milli-mol of n-butyllithium was added to initiate polymerization at 40° C. When 10 minutes elapsed from the commencement of polymerization, a mixture of 75 g of styrene and 275 g of 1,3-butadiene was continuously added at a constant rate over a period of 50 minutes. When 60 minutes elapsed from the commencement of polymerization, a mixture of 75 g of styrene and 75 g of 1,3-butadiene was continuously added at a constant rate over a period of 25 minutes. Further, when 85 minutes elapsed from the commencement of polymerization, 50 g of styrene was continuously added at a constant rate over a period of 20 minutes. After it was confirmed that the conversion reached 100%, 5 g of 1,3-butadiene was added and then 0.54 mmili-mol of tetramethoxysilane was added to carry out a reaction for 30 minutes. Then 10 milli-mol of methanol was added as a stopper to obtain a polymerization liquid having a stopper introduced therein. The highest temperature reached during polymerization was 60° C.

"Rubber J" was recovered from the polymerization liquid having the polymerization stopper added thereto, by the same procedure as described in Example 5, wherein process oil Fukol M available from Fuji Kosan K.K. was used instead of ENERTHENE 1849-A with all other conditions remaining the same. "Rubber j" was recovered from a sample taken from the polymerization liquid at a conversion of 100%.

During polymerization, an extremely minor amount of polymerization liquid was taken from the autoclave at every 5 minutes to evaluate the properties of rubber j in the same manner as in Example 1. The results are shown in Table 1. Coupling percentage of rubber J is also shown in Table 1.

COMPARATIVE EXAMPLE 7

An autoclave equipped with a stirrer was charged with 4,000 g of cyclohexane, 150 g of styrene, 450 g of 1,3-butadiene and 12 milli-mol of tetramethylethylenediamine. Then 6 milli-mol of n-butyllithium was added to initiate polymerization at 40° C. When 20 minutes elapsed from the commencement of polymerization, a mixture of 50 g of styrene and 350 g of 1,3-butadiene was continuously added at a constant rate over a period of 90 minutes. After it was confirmed that the conversion reached 100%, 20 g of 1,3-butadiene was added and then 0.54 mmili-mol of tetramethoxysilane was added to carry out a reaction for 30 minutes. Then 10 milli-mol of methanol was added as a stopper to obtain a polymerization liquid having a stopper introduced thereon. The highest temperature reached during polymerization was 60° C.

"Rubber K" was recovered from the polymerization liquid having the polymerization stopper added thereto, by the same procedures as described in Comparative Example 6. "Rubber k" was recovered from a sample taken from the polymerization liquid at a conversion of 100%.

During polymerization, an extremely minor amount of polymerization liquid was taken from the autoclave at every 5 minutes to evaluate the properties of rubber k in the same manner as in Example 1. The results are shown in Table 1. Coupling percentage of rubber K is also shown in Table 1.

TABLE 1

| Example No. | Ex. 1 | C. Ex. 1 | C. Ex. 2 | Ex. 2 | Ex. 3 | Ex. 4 | C. Ex. 3 | C. Ex. 4 | C. Ex. 5 | Ex. 5 | C. Ex. 6 | C. Ex. 7 |
|---|---|---|---|---|---|---|---|---|---|---|---|---|
| Rubber | A | B | C | d1 | d2 | e | f | g | h1 | h2 | i | j | k |
| Wt. fraction of styrene units (wt. %) | | | | | | | | | | | | | |
| 0–40% | 5.3 | 5.0 | 19.7 | 5.4 | 5.3 | 5.0 | 6.0 | 20.3 | 24.8 | 14.5 | 5.2 | 5.2 | 19.3 |
| 50–60% | 23.2 | 16.3 | 21.3 | 23.3 | 23.1 | 22.4 | 15.3 | 21.0 | 25.5 | 16.2 | 24.4 | 16.0 | 21.0 |
| 70–100% | 41 | 44.7 | 19.8 | 40.9 | 41.4 | 42.5 | 44.5 | 19.5 | 24.8 | 14.4 | 39.2 | 44.2 | 20.1 |
| Vinyl bond units content in butadiene units | | | | | | | | | | | | | |
| 0–40% | 80.3 | 81.2 | 73 | 80.0 | 80.1 | 72.1 | 81.8 | 72.5 | 69.0 | 75.5 | 81.2 | 81.4 | 73.5 |
| 50–60% | 69.8 | 79.5 | 70.5 | 69.5 | 69.9 | 62.5 | 79.0 | 71.1 | 65.5 | 76.5 | 68.8 | 80.3 | 70.0 |
| 70–100% | 61.1 | 57.8 | 69.0 | 61.8 | 60.7 | 52.3 | 57.1 | 69.3 | 64.0 | 76.0 | 61.7 | 56.0 | 68.7 |

| Rubber | A | B | C | d1 | d2 | e | f | g | H | i | j | k |
|---|---|---|---|---|---|---|---|---|---|---|---|---|
| $W_{0.6Mp}/W_{Mp}$ | 0.72 | 0.61 | 0.98 | 0.72 | 0.71 | 0.75 | 0.58 | 1.01 | 0.54 | 0.74 | 0.6 | 0.99 |
| Difference in 1,4-bond units contents | 9.4 | 11.7 | 3.7 | 8.7 | 8.9 | 10.3 | 12,9 | 3.0 | 11.0 | 10.6 | 13.3 | 3.7 |
| Wt. fraction of styrene units (wt. %) *1 | 20.4 | 20.6 | 20.6 | 20.2 | 20.5 | 20.2 | 20.6 | 20.8 | 20.7 | 20.1 | 19.9 | 20.6 |
| Vinyl bond (%) *2 | 72.5 | 72.0 | 71.3 | 72.0 | 71.8 | 63.3 | 72.3 | 70.8 | 70.3 | 72.0 | 72.2 | 71.0 |
| $Mp \times 10^{-4}$ | 27.0 | 25.4 | 24.9 | 26.5 | 25.7 | 26.0 | 25.8 | 25.2 | 26.0 | 45.2 | 44.0 | 47.2 |
| $Mw \times 10^{-4}$ | 24.7 | 23.7 | 23.3 | 43.4 | 43.0 | 56.5 | 40.4 | 43.3 | 31.1 | 85.9 | 83.1 | 86.5 |
| Mw/Mn | 1.13 | 1.09 | 1.08 | 1.62 | 1.62 | 1.78 | 1.55 | 1.60 | 1.88 | 1.82 | 1.78 | 1.78 |

| Rubber | — | — | — | D1 | D2 | E | F | G | H1 | I | J | K |
|---|---|---|---|---|---|---|---|---|---|---|---|---|
| Coupling % (wt. %) | — | — | — | 31 | 31 | 56 | 27 | 27 | 35 | 51 | 47 | 49 |

Note
*1 Weight fraction of styrene units (wt. %): average weight fraction of styrene units in the total copolymer (wt. %)
*2 Vinyl Bond (%): average vinyl bond units content in the butadiene units In table 1, "0–40%", "50–60%" and "70–100%" represent a portion produced for a duration in which a polymer production percentage varies from 0% to 40% by weight, from 50% to 60% by weight, and from 70% to 100% by weight, respectively.

EXAMPLE 6

Using a 250 ml Brabender mixer, 60 parts of rubber A prepared in Example 1, 40 parts of natural rubber (CV-60), 50 parts of carbon black N339 ("Seast KH" available from Tokai Carbon K.K., HAF-HS, nitrogen adsorption specific surface area: 93 m$^2$/g, DBP adsorption: 119 ml/100 g), 5 parts of aroma oil ("Fukol M" available from Fuji Kosan K.K.), 2 parts of stearic acid, 3 parts of zinc oxide and 1 part of antioxidant ("Nocrac 6C" available from Ouchi Shinko K.K.) were kneaded together for 4 minutes at a temperature such that the thus-kneaded rubber composition taken from the mixer had a temperature of 120° C.

Then using an open roll maintained at 50° C., 1 part of sulfur and 1.7 parts of N-cyclohexyl-2-benzothiazolesulfenamide as crosslinking accelerator were incorporated in the rubber composition.

The resultant crosslinkable rubber composition was press-cured at 160° C. for 15 minutes to give a crosslinked rubber specimen. The properties of crosslinked rubber were evaluated. The results are shown in Table 2.

COMPARATIVE EXAMPLE 8

Crosslinked rubber was made by the same procedures as described in Example 6 wherein rubber B prepared in Comparative Example 1 was used instead of rubber A prepared in Example 1 with all other conditions remaining the same. The properties were evaluated. The results are shown in Table 2.

COMPARATIVE EXAMPLE 9

Crosslinked rubber was made by the same procedures as described in Example 6 wherein rubber C prepared in Comparative Example 2 was used instead of rubber A prepared in Example 1 with all other conditions remaining the same. The properties were evaluated. The results are shown in Table 2.

COMPARATIVE EXAMPLE 10

Crosslinked rubber was made by the same procedures as described in Example 6 wherein synthetic butadiene rubber ("Nipol BR-1220" available from Zeon Corporation, Mooney viscosity: about 40) was used instead of natural rubber with all other conditions remaining the same. The properties were evaluated. The results are shown in Table 2.

TABLE 2

| Example No. | Ex.6 | C.Ex.8 | C.Ex.9 | C.Ex.10 |
| --- | --- | --- | --- | --- |
| Rubber A | 60 | — | — | — |
| Rubber B | — | 60 | — | 60 |
| Rubber C | — | — | 60 | — |
| Natural rubber | 40 | 40 | 40 | — |
| Butadiene rubber | — | — | — | 40 |
| Heat build-up | 105 | 95 | 100 | 108 |
| Wed skid resistance | 107 | 86 | 100 | 95 |
| Tensile strength | 12 | 101 | 100 | 77 |
| Abrasion resistance | 103 | 102 | 100 | 98 |

Note:
Index number is a relative value as the value in Comparative Example 9 is 100

EXAMPLE 7

Using a 250 mL Brabender mixer, 70 parts of rubber D1 prepared in Example 2, 30 parts of natural rubber (CV-60), 50 parts of carbon black N339 ("Seast KH" available from Tokai Carbon K.K., HAF-HS, nitrogen adsorption specific surface area: 93 $m^2/g$, DBP adsorption: 119 ml/100 g), 5 parts of process oil ("Fukol M" available from Fuji Kosan K.K.), 2 parts of stearic acid, 3 parts of zinc oxide and 1 part of antioxidant ("Nocrac 6C" available from Ouchi Shinko K.K.) were kneaded together for 4 minutes at a temperature such that the thus-kneaded rubber composition taken from the mixer had a temperature of 120° C.

Then using an open roll maintained at 50° C., 1 part of sulfur and 1.7 parts of N-cyclohexyl-2-benzothiazolesulfenamide as crosslinking accelerator were incorporated in the rubber composition.

The resultant crosslinkable rubber composition was press-cured at 160° C. for 15 minutes to give a crosslinked rubber specimen. The properties of crosslinked rubber were evaluated. The results are shown in Table 3.

EXAMPLES 8 and 9

Crosslinked rubbers were made by the same procedures as described in Example 7 wherein rubber D2 prepared in Example 3 was used in Example 8, and rubber E prepared in Example 4 was used in Example 9, instead of rubber D1 prepared in Example 2 with all other conditions remaining the same. The properties were evaluated. The results are shown in Table 3.

COMPARATIVE EXAMPLES 11–13

Crosslinked rubbers were made by the same procedures as described in Example 7 wherein rubber F prepared in Comparative Example 3 was used in Comparative Example 11, rubber G prepared in Comparative Example 4 was used in Comparative Example 12, and rubber H prepared in Comparative Example 5 was used in Comparative Example 13, instead of rubber D1 prepared in Example 2. All other conditions remained the same. The properties were evaluated. The results are shown in Table 3.

TABLE 3

| Example No. | Ex.7 | Ex. 8 | Ex. 9 | C. Ex. 11 | C. Ex. 12 | C. Ex. 13 |
| --- | --- | --- | --- | --- | --- | --- |
| Rubber D1 | 70 | — | — | — | — | — |
| Rubber D2 | — | 70 | — | — | — | — |
| Rubber E | — | — | 70 | — | — | — |
| Rubber F | — | — | — | 70 | — | — |
| Rubber G | — | — | — | — | 70 | — |
| Rubber H | — | — | — | — | — | 70 |
| Natural rubber | 30 | 30 | 30 | 30 | 30 | 30 |
| Heat build-up | 116 | 113 | 111 | 95 | 100 | 64 |
| Wed skid resistance | 107 | 106 | 102 | 79 | 100 | 96 |
| Tensile strength | 103 | 104 | 99 | 98 | 100 | 94 |
| Abrasion resistance | 110 | 111 | 112 | 110 | 100 | 78 |

Note: Index number is a relative value as the value in Comparative Example 12 is 100

EXAMPLE 10

60 parts of rubber D1 prepared in Example 2, 40 parts of natural rubber (CV-60), 30 parts of silica ("Zeosil 1165MP" available from Rhodia Co., nitrogen adsorption specific surface area: 175 $m^2/g$), 2.4 parts of silane coupling agent (Si69, available from Degussa Co.) and 10 parts of process oil ("Fukol M" available from Fuji Kosan K.K.) were kneaded together for 2 minutes. Then, 15 parts of silica ("Zeosil 1165MP"), 1.2 parts of silane coupling agent (Si69) and 1.5 parts of stearic acid were added and kneaded together for 3 minutes at a temperature such that the thus-kneaded rubber composition taken had a temperature of 150° C.

Then using an open roll maintained at 50° C., 1 part of zinc oxide and 2 parts of antioxidant (Nocrac 6C) were added. Then, the mixture was kneaded together for 3 minutes by a 250 ml Brabender mixer at a temperature such that the thus-kneaded rubber composition taken from the mixer had a temperature of 150° C. Finally, 1 part of sulfur and 2.5 parts of crosslinking accelerator (1.1 parts of diphenylguanidine plus 1.4 parts of N-cyclohexyl-2-benzothiazoleslfenamide) were incorporated.

The resultant crosslinkable rubber composition was press-cured at 160° C. for 15 minutes to give a crosslinked rubber specimen. The properties of crosslinked rubber were evaluated. The results are shown in Table 4.

EXAMPLE 11

Crosslinked rubber was made by the same procedures as described in Example 10 wherein rubber E prepared in Example 4 was used instead of rubber D1 prepared in Example 2 with all other conditions remaining the same. The properties were evaluated. The results are shown in Table 4.

COMPARATIVE EXAMPLES 14 AND 15

Crosslinked rubbers were made by the same procedures as described in Example 10 wherein rubber F prepared in Comparative Example 3 was used in Comparative Example 14 and rubber G prepared in Comparative Example 4 was used in Comparative Example 15, instead of rubber D1 prepared in Example 2 with all other conditions remaining the same. The properties were evaluated. The results are shown in Table 4.

TABLE 4

| Example No. | Ex.10 | Ex.11 | C.Ex.14 | C.Ex.15 |
|---|---|---|---|---|
| Rubber D1 | 60 | — | — | — |
| Rubber E | — | 60 | — | — |
| Rubber F | — | — | 60 | — |
| Rubber G | — | — | — | 60 |
| Natural rubber | 40 | 40 | 40 | 40 |
| Heat build-up | 122 | 125 | 105 | 100 |
| Wed skid resistance | 140 | 115 | 82 | 100 |
| Tensile strength | 111 | 106 | 108 | 100 |
| Abrasion resistance | 106 | 110 | 105 | 100 |

Note:
Index number is a relative value as the value in Comparative Example 15 is 100

EXAMPLE 12

75.625 parts of rubber I prepared in Example 5, 25 parts of isoprene rubber (Nipol IR-2200 available from Zeon Corporation), 27.5 parts of styrene-butadiene rubber (random copolymer, Nipol SBR-1712 available from Zeon Corporation), 43 parts of silica ("Zeosil 1165MP" available from Rhodia Co., nitrogen adsorption specific surface area: 175 $m^2/g$), 3.6 parts of silane coupling agent (Si69, available from Degussa Co.) and 10 parts of process oil ("Fukol M" available from Fuji Kosan K.K.) were kneaded together for 2 minutes. Then, 22 parts of silica ("Zeosil 1165MP"), 1.7 parts of silane coupling agent (Si69), 15 parts of carbon black N220 ("Seast 6" available from Tokai Carbon K.K., ISAF, nitrogen adsorption specific surface area: 119 $m^2/g$, DBP adsorption: 114 ml/100 g), and 2 parts of stearic acid were added and kneaded together for 3 minutes at a temperature such that the thus-kneaded rubber composition taken had a temperature of 150° C.

Then using an open roll maintained at 50° C., 1.5 parts of zinc oxide and 2 parts of antioxidant (Nocrac 6C) were added. Then, the mixture was kneaded together for 3 minutes by a 250 ml Brabender mixer at a temperature such that the thus-kneaded rubber composition taken from the mixer had a temperature of 150° C. Finally, 1.4 parts of sulfur and 3.2 parts of crosslinking accelerator (1.5 parts of diphenylguanidine plus 1.7 parts of N-cyclohexyl-2-benzothiazolesulfenamide) were incorporated.

The resultant crosslinkable rubber composition was press-cured at 160° C. for 20 minutes to give a crosslinked rubber specimen. The properties of crosslinked rubber were evaluated. The results are shown in Table 5.

COMPARATIVE EXAMPLES 16 AND 17

Crosslinked rubbers were made by the same procedures as described in Example 12 wherein rubber J prepared in Comparative Example 6 was used in Comparative Example 16 and rubber K prepared in Comparative Example 7 was used in Comparative Example 17, instead of rubber I prepared in Example 5 with all other conditions remaining the same. The properties were evaluated. The results are shown in Table 5.

TABLE 5

| Example No. | Ex.12 | C.Ex.16 | C.Ex.17 |
|---|---|---|---|
| Rubber I | 75.625 | — | — |
| Rubber J | — | 75.625 | — |
| Rubber K | — | — | 75.625 |
| Isoprene rubber | 20 | 20 | 20 |
| Isoprene-butadiene rubber | 27.5 | 27.5 | 27.5 |
| Heat build-up | 109 | 101 | 100 |
| Wed skid resistance | 125 | 96 | 100 |
| Tensile strength | 1.10 | 97 | 100 |
| Abrasion resistance | 104 | 102 | 100 |

Note:
Index number is a relative value BS the value in Comparative Example 17 is 100

As seen from the above data, rubber composition of Comparative Example 8 comprising straight chain tapered rubber (rubber B prepared in Comparative Example 1, outside the present invention) and natural rubber exhibits large heat build up and poor wet skid resistance.

Rubber composition of Comparative Example 9 comprising straight chain random copolymer rubber (rubber C prepared in Comparative Example 2) and natural rubber exhibits large heat build up and poor wet skid resistance.

Rubber composition of Comparative Example 10 comprising straight chain tapered rubber (rubber B prepared in Comparative Example 1, outside the present invention) and butadiene rubber exhibits poor wet skid resistance and low tensile strength.

Rubber composition of Comparative Example 11 comprising terminal-modified coupled tapered copolymer rubber (rubber F prepared in Comparative Example 3) and natural rubber exhibits large heat build up and poor wet skid resistance.

Rubber composition of Comparative Example 12 comprising terminal-modified coupled random copolymer rubber (rubber G prepared in Comparative Example 4) and natural rubber exhibits large heat build up, poor wet skid resistance and poor abrasion resistance.

Rubber composition of Comparative Example 13 is a blend of random copolymer rubber, i.e., a coupled random copolymer rubber (rubber H prepared in Comparative Example 5) and natural rubber, and exhibits insufficient properties, in reduced heat build up, wet skid resistance, tensile strength and abrasion resistance. Especially heat build up is large and abrasion resistance is very poor.

Rubber composition of Comparative Example 14 comprising coupled tapered copolymer rubber (rubber F prepared in Comparative Example 3, outside the present invention) and natural rubber, which is similar to rubber composition of Comparative Example 11, exhibits very poor wet skid resistance.

Rubber composition of Comparative Example 15 comprising coupled tapered copolymer rubber (rubber G prepared in Comparative Example 4) and natural rubber, which is similar to rubber composition of Comparative Example 12, exhibits large heat build-up, very poor wet skid resistance and very poor tensile strength.

Rubber composition of Comparative Example 16 comprising oil-extended coupled tapered copolymer rubber (rubber J prepared in Comparative Example 6) and synthetic rubber, which is a blend of synthetic isoprene rubber and styrene-butadiene random copolymer rubber, exhibits very poor wet skid resistance.

Rubber composition of Comparative Example 17 comprising oil-extended coupled random copolymer rubber (rubber K prepared in Comparative Example 7) and synthetic rubber, which is a blend of synthetic isoprene rubber and styrene-butadiene random copolymer rubber, exhibits very poor wet skid resistance, and insufficiently reduced heat build up and poor tensile strength.

In contrast, as seen from Examples 6–12, whether the tapered rubber of the present invention is straight-chain rubber (rubber A prepared in Example 1) or terminal-modified coupled rubber (rubber D1, rubber D2, rubber E or rubber I, prepared in Examples 2–5), rubber compositions comprising the tapered rubber are satisfactory in the properties of reduced heat build-up, wet skid resistance, tensile strength and abrasion resistance.

EXAMPLE 13

An autoclave equipped with a stirrer was charged with 4,000 g of cyclohexane, 200 g of styrene, 100 g of 1,3-butadiene and 12 milli-mol of tetramethylethylenediamine. Then 7.8 milli-mol of n-butyllithium was added to initiate polymerization at 40° C. When 3 minutes elapsed from the commencement of polymerization, 130 g of 1,3-butadiene was continuously added at a constant rate over a period of 7 minutes. When 10 minutes elapsed from the commencement of polymerization, 100 g of 1,3-butadiene was continuously added at a constant rate over a period of 10 minutes. When 20 minutes elapsed from the commencement of polymerization, 80 g of 1,3-butadiene was continuously added at a constant rate over a period of 10 minutes. When 30 minutes elapsed from the commencement of polymerization, 50 g of 1,3-butadiene was continuously added at a constant rate over a period of 20 minutes. When 50 minutes elapsed from the commencement of polymerization, 250 g of 1,3-butadiene was continuously added at a constant rate over a period of 20 minutes. After completion of the addition, polymerization was carried out for 20 minutes. Further, when 90 minutes elapsed from the commencement of polymerization, 90 g of 1,3-butadiene was continuously added at a constant rate over a period of 10 minutes. During polymerization, an extremely minor amount of a polymerization liquid was taken from the autoclave at every 5 minutes to measure a polymer production percentage and a weight fraction of styrene units in a copolymer at that time. After it was confirmed that the conversion reached 100%, 12 milli-mol of methanol was added as a polymerization stopper to a polymerization liquid. The highest temperature reached during polymerization was 45° C.

To the polymerization liquid having the polymerization stopper added thereto, 0.15 part of 2,4-bis(n-octylthiomethyl)-6-methylphenol was added per 100 parts of rubber obtained in the polymerization liquid. A polymer was recovered by steam stripping, dehydrated by rolls and then dried by a hot air dryer to give "rubber L". Water having added thereto 30 ppm of polyoxyethylene-polyoxypropylene ether was used as water in a stripping zone. The stripping was carried out so that the concentration of crumb-like diene polymer rubber in the water in stripping zone was 5% by weight.

As for rubber L, ratio of $W_{0.6Mp}/W_{Mp}$ was determined. Weight fraction of styrene units and vinyl bond units content in butadiene units were determined on each of portions of copolymer produced for a duration in which a polymer production percentage varied from 0% by weight to 40% by weight, from 50% by weight to 60% by weight, and from 70% by weight to 100% by weight, respectively. Further, differences in 1,4-bond units contents, average weight fraction of styrene units in total polymer, average vinyl bond unit content in butadiene units, Mp, weight average molecular weight (Mw), and molecular weight distribution (Mw/Mn) were determined. The results are shown in Table 6.

COMPARATIVE EXAMPLE 18

An autoclave equipped with a stirrer was charged with 4,000 g of cyclohexane, 200 g of styrene, 40 g of 1,3-butadiene and 12 milli-mol of tetramethylethylenediamine. The temperature was elevated to 45° C. Then 7.8 milli-mol of n-butyllithium was added to initiate polymerization. When 5 minutes elapsed from the commencement of polymerization, 180 g of 1,3-butadiene was continuously added at a constant rate over a period of 10 minutes. When 15 minutes elapsed from the commencement of polymerization, 150 g of 1,3-butadiene was continuously added at a constant rate over a period of 10 minutes. When 25 minutes elapsed from the commencement of polymerization, 80 g of 1,3-butadiene was continuously added at a constant rate over a period of 25 minutes. When 45 minutes elapsed from the commencement of polymerization, 250 g of 1,3-butadiene was continuously added at a constant rate over a period of 20 minutes. When 85 minutes elapsed from the commencement of polymerization, 100 g of 1,3-butadiene was continuously added at a constant rate over a period of 10 minutes. During polymerization, an extremely minor amount of a polymerization liquid was taken from the autoclave at every 5 minutes to measure a polymer production percentage and a weight fraction of styrene units in a copolymer at that time. After it was confirmed that the conversion reached 100%, 12 milli-mol of methanol was added as a polymerization stopper to a polymerization liquid. The highest temperature reached during polymerization was 50° C. By the same procedures as described in Example 13, "rubber M" was obtained from the polymerization liquid.

The properties of rubber M was evaluated in the same manner as for rubber L in Example 13. The results are shown in Table 6.

COMPARATIVE EXAMPLE 19

An autoclave equipped with a stirrer was charged with 4,000 g of cyclohexane, 150 g of styrene, 450 g of 1,3-butadiene and 12 milli-mol of tetramethylethylenediamine. Then 9.5 milli-mol of n-butyllithium was added to initiate polymerization at 40° C. When 10 minutes elapsed from the commencement of polymerization, a mixture of 50 g of styrene and 350 g of 1,3-butadiene was continuously added at a constant rate over a period of 50 minutes. After it was confirmed that the conversion reached 100%, 12 milli-mol of methanol was added as a polymerization stopper to a polymerization liquid. The highest temperature reached during polymerization was 60° C. By the same procedures as described in Example 13, "rubber N" was obtained from the polymerization liquid.

During polymerization, an extremely minor amount of a polymerization liquid was taken from the autoclave at every 5 minutes to measure a polymer production percentage and a weight fraction of styrene units in a copolymer at that time. The properties of rubber N were evaluated in the same manner as for rubber L in Example 13. The results are shown in Table 6.

EXAMPLE 14

By the same procedures as described in Example 13, polymerization was carried out. When the conversion reached 100%, 5 g of 1,3-butadiene was added to the polymerization liquid, and further 0.45 milli-mol of tin tetrachloride was added to carry out a reaction for 15 minutes.

During the polymerization, an extremely minor amount of a sample of polymerization liquid was taken from the reactor at every 5 minutes from the commencement of polymerization and immediately before the addition of tin tetrachloride, to measure a polymer production percentage and a weight fraction of styrene units.

Then 4.5 milli-mol of 4,4'-bis(N,N-diethylamino) benzophenone was added to carry out a reaction for 10 minutes. Then 12 milli-mol of methanol was added as a polymerization stopper to a polymerization liquid. The highest temperature reached during polymerization was 60° C.

By the same procedure as described in Example 13, "rubber P" was obtained from the polymerization liquid. Further "rubber p" was recovered from a sample taken from a polymerization liquid immediately before the addition of tin tetrachloride.

The properties of rubber P and rubber p were evaluated. The results are shown in Table 6. Coupling percentage of rubber D is also shown in Table 6.

COMPARATIVE EXAMPLE 20

By the same procedures as employed in Comparative Example 19, polymerization was carried out. By the same procedures as employed in Example 14, modification reaction was carried out wherein, when the conversion reached 100%, N-methyl-ε-caprolactam was added instead of 4,4'-bis(N,N-diethylamino)benzophenone with all other conditions remaining the same. Thus, "rubber q" and "rubber Q" were obtained instead of rubber n and rubber N, respectively.

The properties of rubber Q and rubber q were evaluated. The results are shown in Table 6. Coupling percentage of rubber E is also shown in Table 6.

COMPARATIVE EXAMPLE 21

An autoclave equipped with a stirrer was charged with 4,000 g of cyclohexane, 300 of 1,3-butadiene and 12 milli-mol of tetramethylethylenediamine. The temperature was elevated to 40° C. and then 12.0 milli-mol of n-butyllithium was added to initiate polymerization. When 10 minutes elapsed from the commencement of polymerization, a mixture of 150 g of styrene and 250 g of 1,3-butadiene was continuously added at a constant rate over a period of 10 minutes. During polymerization, an extremely minor amount of a polymerization liquid was taken from the autoclave at every 5 minutes to measure a polymer production percentage and a weight fraction of styrene units in a copolymer at that time. After it was confirmed that the conversion reached 100%, 20 milli-mol of methanol was added at a stopper to obtain a polymerization liquid, "sr1" having a stopper introduced therein. The highest temperature reached during polymerization was 70° C.

An autoclave equipped with a stirrer was charged with 4,000 g of cyclohexane, 150 g of styrene, 670 g of 1,3-butadiene and 10 milli-mol of tetramethylethylenediamine. The temperature was elevated to 40° C. and then 7.8 milli-mol of n-butyllithium was added to initiate polymerization at 40° C. When 20 minutes elapsed from the commencement of polymerization, a mixture of 5 g of styrene and 290 g of 1,3-butadiene was continuously added at a constant rate over a period of 40 minutes. After it was confirmed that the conversion reached 100%, 20 g of 1,3-butadiene was added, and then 0.45 milli-mol of tin tetrachloride to carry out a reaction. During polymerization, an extremely minor amount of a polymerization liquid was taken from the autoclave at every 5 minutes and immediately before the addition of tin tetrachloride to measure a polymer production percentage and a weight fraction of styrene unites in a copolymer at that time. Then, 12 milli-mol of methanol was added as a polymerization stopper to obtain a polymerization liquid "sr2" having a stopper introduced therein. The highest temperature reached during polymerization was 70° C.

Polymerization liquid sr1 having a stopper introduced therein and polymerization liquid sr2 having a stopper introduced therein were mixed together at a ratio of 1:9 by weight. By the same procedures as those described in Example 1, "rubber R" was taken from the mixed polymerization liquid. Similarly, "rubber r1" was recovered from a sample taken from polymerization liquid sr1 having a stopper introduced therein. "Rubber r2" was recovered from a polymerization liquid taken immediately before the addition of tin tetrachloride for the preparation of polymerization liquid sr2 having a stopper introduced therein. "Rubber R2" was recovered from polymerization liquid sr 2 having a stopper introduced therein.

The properties of rubber r1, rubber r2, rubber R1 and rubber R were evaluated in the same manner as described in Example 13. The results are shown in Table 6. The value of $M_{0.6Mp}/W_{Mp}$ of rubber R in Table 6 was determined as follows. Coupled copolymer molecules in rubber R was detected by a multiple light scattering detector, based on the absolute molecular weight and molecule size. The measurement of $W_{0.6Mp}$ and $W_{Mp}$ was made only on the portion other than the coupled copolymer molecules, i.e., on copolymer molecules having a straight chain structure.

TABLE 6

| Example No. | Ex. 13 | C. Ex. 18 | C. Ex. 19 | Ex. 14 | C. Ex. 20 | C. Ex. 21 | |
|---|---|---|---|---|---|---|---|
| Rubber | L | M | N | P | g | r1 | r2 |
| Wt. fraction of styrene units (wt. %) | | | | | | | |
| 0–30% | 41.3 | 45.3 | 19.5 | 41.0 | 19.9 | 44.3 | 17.0 |
| 40–50% | 21.4 | 15.8 | 23.5 | 21.7 | 23.0 | 46.8 | 15.4 |
| 60–100% | 6.8 | 6.8 | 20.6 | 6.3 | 20.4 | 44.2 | 13.1 |
| Vinyl bond units content in butadiene units | | | | | | | |
| 0–30% | 63.9 | 57.1 | 73.1 | 64.7 | 72.9 | 60.1 | 79.9 |
| 40–50% | 71.2 | 80.9 | 72.8 | 70.9 | 72.1 | 55.1 | 77.6 |
| 60–100% | 80.5 | 80.0 | 69.3 | 80.9 | 69.5 | 47.5 | 56.7 |

| Rubber | L | M | N | P | Q | R |
|---|---|---|---|---|---|---|
| $W_{0.6Mp}/W_{Mp}$ | 1.17 | 1.33 | 0.98 | 1.17 | 1.01 | 1.38 |
| Difference in 1,4-bind units contents | | | | | | |
|  | 8.2 | 10.7 | 3.7 | 8.5 | 3.0 | 20.1 |
| Wt. fraction of styrene units (wt. %) *1 | | | | | | |
|  | 20.2 | 20.2 | 20.6 | 20.3 | 20.8 | 20.2 |
| Vinyl bond (%) *2 | 73.0 | 73.1 | 71.3 | 73.2 | 70.8 | 72.5 |
| Mp × 10⁻⁴ | 27.2 | 27.2 | 24.9 | 27.0 | 25.2 | 26.8 |
| Mw × 10⁻⁴ | 24.9 | 24.9 | 23.3 | 44.1 | 43.3 | 41.0 |
| Mw/Mn | 1.11 | 1.11 | 1.08 | 1.62 | 1.60 | 1.70 |

TABLE 6-continued

| Example No. | Ex. 13 | C. Ex. 18 | C. Ex. 19 | Ex. 14 | C. Ex. 20 | C. Ex. 21 |
|---|---|---|---|---|---|---|
| Rubber | — | — | — | D | E | R2 |
| Coupling % (wt. %) | — | — | — | 33 | 27 | 28 |

Note
*1 Weight fraction of styrene units (wt. %): average weight fraction of styrene units in the total copolymer (wt. %)
*2 Vinyl bond (%): average vinyl bond units content in the butadiene units In table 1, "0–30%", "40–50%" and "60–100%" represent a portion produced for a duration in which a polymer production percentage varies from 0% to 30% by weight, from 40% to 50% by weight, and from 60% to 100% by weight, respectively.

EXAMPLE 15

Using a 250 ml Brabender mixer, 60 parts of rubber L prepared in Example 13, 40 parts of natural rubber (CV-60), 50 parts of carbon black N339 ("Seast KH" available from Tokai Carbon K.K., HAF-HS, nitrogen adsorption specific surface area; 93 $m^2/g$, DBP absorption: 119 ml/100 g), 5 parts of process oil ("Fukol M" available from Fuji Kosan K.K.), 2 parts of stearic acid, 3 parts of zinc oxide and 1 part of antioxidant ("Nocrao 6C") available from Ouchi Shinko K.K.) were kneaded together for 4 minutes at a temperature such that the thus-kneaded rubber composition taken from the mixer had a temperature of 120° C.

Then using an open roll maintained at 50° C., 1 part of sulfur and 1.7 parts of N-cyclohexyl-2-benzothiazolesulfenamide as crosslinking accelerator were incorporated in the rubber composition.

The resultant crosslinkable rubber composition was press-cured at 160° C. for 15 minutes to give a crosslinked rubber specimen. The properties of crosslinked rubber were evaluated. The results are shown in Table 7.

COMPARATIVE EXAMPLES 22 AND 23

Crosslinked rubber was made by the same procedures as described in Example 15 wherein rubber M prepared in Comparative Example 18 was used in Comparative Example 22 and rubber N prepared in Comparative Example 19 was used in Comparative Example 23, instead of rubber L prepared in Example 13 with all other conditions remaining the same. The properties of crosslinked rubbers were evaluated. The results are shown in Table 7.

TABLE 7

| Example No. | Ex.15 | C.Ex.22 | C.Ex.23 |
|---|---|---|---|
| Rubber L | 60 | — | — |
| Rubber M | — | 60 | — |
| Rubber N | — | — | 60 |
| Natural rubber | 40 | 40 | 40 |
| Heat build-up | 103 | 93 | 100 |
| Wed skid resistance | 105 | 89 | 100 |
| Tensile strength | 104 | 102 | 100 |
| Abrasion resistance | 104 | 104 | 100 |

Note:
Index number is a relative value as the value in Comparative Example 23 is 100

EXAMPLE 16

Crosslinked rubber was made by the same procedures as described in Example 15 wherein 70 parts of rubber P prepared in Example 14 and 30 parts of natural rubber were used instead of 60 parts of rubber L prepared in Example 13 and 40 parts of natural rubber, with all other conditions remaining the same. The properties of crosslinked rubber were evaluated. The results are shown in Table 8.

COMPARATIVE EXAMPLES 24 AND 25

Crosslinked rubbers were made by the same procedures as described in Example 15 wherein 70 parts of rubber Q or rubber R prepared in Comparative Examples 20 and 21, and 30 parts of natural rubber were used instead of 60 parts of rubber L prepared in Example 13 and 40 parts of natural rubber, with all other conditions remaining the same. The properties of crosslinked rubbers were evaluated. The results are shown in Table 8.

TABLE 8

| Example No. | Ex.16 | C.Ex.24 | C.Ex.25 |
|---|---|---|---|
| Rubber P | 70 | — | — |
| Rubber Q | — | 70 | — |
| Rnbber R | — | — | 70 |
| Natural rubber | 30 | 30 | 30 |
| Heat build-up | 110 | 100 | 76 |
| Wed skid resiatance | 114 | 100 | 83 |
| Tensile strength | 105 | 100 | 108 |
| Abrasion resistance | 109 | 100 | 92 |

Note:
Index number is a relative value as the value in Comparative Example 24 is 100

EXAMPLE 17

60 parts of rubber P prepared in Example 14, 40 parts of natural rubber (CV-60), 30 parts of silica (Zeolsil, 1165MP), 2.4 parts of silane coupling agent (Si69) and 10 parts of process oil (Fukol M) were kneaded together for 2 minutes. Then, 15 parts of silica (Zeolsil 1165MP), 1.2 parts of silane coupling agent (Si69) and 1.5 parts of stearic acid were added and kneaded together for 3 minutes at a temperature such that the thus-kneaded rubber composition taken from a mixer had a temperature of 150° C. Using an open roll maintained at 50° C., 1 part of zinc oxide and 2 parts of antioxidant (Nocrac 6C) were added. The mixture was kneaded in a 250 ml Brabender mixer for 3 minutes at a temperature such that the thus-kneaded rubber composition taken from the mixer had a temperature of 150° C.

Finally, using an open roll maintained at 50° C., 1 part of sulfur and 2.5 parts of crosslinking accelerator (1.1 parts of diphenylguanidine plus 1.4 parts of N-cyclohexyl-2-benzothiazolesulfenamide) were incorporated in the rubber composition.

The resultant crosslinkable rubber composition was press-cured at 160° C. for 15 minutes to give a crosslinked rubber specimen. The properties of crosslinked rubber were evaluated. The results are shown in Table 9.

COMPARATIVE EXAMPLE 26

Crosslinked rubber was made by the same procedures as described in Example 16 wherein rubber Q prepared in Comparative Example 20 was used instead of rubber P prepared in Example 14 with all other conditions remaining the same. The properties of crosslinked rubber were evaluated. The results are shown in Table 9.

TABLE 9

| Example No. | Ex.17 | C.Ex.26 |
|---|---|---|
| Rubber P | 60 | — |
| Rubber Q | — | 60 |
| Natural rubber | 40 | 40 |
| Heat build-up | 121 | 100 |
| Wed skid resistance | 144 | 100 |
| Tensile strength | 111 | 100 |
| Abrasion resistance | 105 | 100 |

Note:
Index number is a relative value as the value in Comparative Example 26 is 100

As seen from the above data, rubber composition of Comparative Example 22 comprising straight chain tapered rubber (rubber M prepared in Comparative Example 18, outside the present invention) and natural rubber exhibits large heat build up and poor wet skid resistance.

Rubber composition of Comparative Example 23 comprising straight chain random copolymer rubber (rubber N prepared in Comparative Example 19) and natural rubber exhibits large heat build up, poor wet skid resistance, low tensile strength and poor abrasion resistance.

Rubber composition of Comparative Example 24 comprising terminal-modified coupled tapered copolymer rubber (rubber Q prepared in Comparative Example 20) and natural rubber exhibits large heat build up, poor wet skid resistance, low tensile strength and poor abrasion resistance.

Rubber composition of Comparative Example 25 is a blend of random copolymer rubber, i.e., a coupled random copolymer rubber (rubber Q prepared in Comparative Example 20) and natural rubber, and exhibits insufficient properties, in reduced heat build up, wet skid resistance, tensile strength and abrasion resistance. Especially heat build up is large and wet skid resistance is very poor.

Rubber composition of Comparative Example 26 comprising terminal-modified coupled random copolymer rubber (rubber Q prepared in Comparative Example 20) and natural rubber, exhibits large heat build-up, poor wet skid resistance, low tensile strength and poor abrasion resistance. Especially heat build-up is very large, and wet skid resistance and tensile strength are very poor.

In contrast, as seen from Examples 15 and 16, whether the tapered rubber of the present invention is straight-chain rubber (rubber L prepared in Example 13) or terminal-modified coupled rubber (rubber P prepared in Example 14), rubber compositions comprising the tapered rubber are satisfactory in the properties of reduced heat build-up, wet skid resistance, tensile strength and abrasion resistance.

INDUSTRIAL APPLICABILITY

The rubber composition of the present invention, namely, a rubber composition comprising a tapered rubber (a) or coupled tapered rubber (b) of the present invention and natural rubber or a synthetic rubber gives a rubber shaped article exhibiting reduced heat build-up, enhanced wet skid resistance and reduced fuel consumption, and having high tensile strength and abrasion resistance.

Therefore the rubber composition of the present invention is useful as rubber material for, for example, tire parts such as tread, sidewall, under-tread, carcass and bead of four-seasons tires and studless tires; vibration insulators, hoses, window frames, belts, shoe soles, and automobiles parts; and reinforcing rubbers for high-impact polystyrene, ABS resin and other resins. The rubber composition is especially useful for tread of low fuel consumption tires and high-performance tires.

What is claimed is:

1. A tapered aromatic vinyl-conjugated diene copolymer rubber characterized by a tapered copolymer comprising aromatic vinyl monomer units and conjugated diene monomer units, and having a ratio $W_{0.6Mp}/W_{Mp}$ in the range of from 0.65 to 0.9 or from 1.1 to 1.3 wherein Mp is molecular weight of a copolymer molecule corresponding to the peak of a molecular weight distribution curve obtained by gel permeation chromatography, $W_{Mp}$ is a weight fraction of aromatic vinyl monomer units in the copolymer molecule having a molecular weight Mp, and $W_{0.6Mp}$ is a weight fraction of aromatic vinyl monomer units in a copolymer molecule having a molecular weight of Mp×0.6.

2. The tapered aromatic vinyl-conjugated diene copolymer rubber according to claim 1, wherein said ratio $W_{0.6Mp}/W_{Mp}$ is in the range of from 0.65 to 0.9.

3. The tapered aromatic vinyl-conjugated diene copolymer rubber according to claim 1, wherein said ratio $W_{0.6Mp}/W_{Mp}$ is in the range of from 1.1 to 1.3.

4. The tapered aromatic vinyl-conjugated diene copolymer rubber according to claim 1, wherein a polymer chain terminal of the tapered copolymer is modified.

5. The tapered aromatic vinyl-conjugated diene copolymer rubber according to claim 1, which is a coupled rubber comprised of a plurality of tapered aromatic vinyl-conjugated diene copolymer molecules wherein a polymer chain terminal of each copolymer molecule is bound together.

6. The tapered aromatic vinyl-conjugated diene copolymer rubber according to claim 1, which comprises 10% to 50% by weight of aromatic vinyl monomer units and 90% to 50% by weight of conjugated diene monomer units.

7. The tapered aromatic vinyl-conjugated diene copolymer rubber according to claim 1, wherein the conjugated diene monomer units have a vinyl bond unit content of 50% to 90% by weight based on the conjugated diene monomer units.

8. The tapered aromatic vinyl-conjugated diene copolymer rubber according to claim 1, wherein the tapered copolymer has a weight average molecular weight (Mw) in the range of 50,000 to 2,000,000 as expressed in terms of that of polystyrene as measured by gel permeation chromatography.

9. The tapered aromatic vinyl-conjugated diene copolymer rubber according to claim 1, wherein the molecular weight distribution (Mw/Mn) of the copolymer, as expressed in terms of a ratio of the weight average molecular weight (Mw) to the number average molecular weight (Mn), is in the range of 1.05 to 3.5.

10. A process for producing a tapered aromatic vinyl-conjugated diene copolymer rubber wherein an aromatic vinyl monomer and a conjugated diene monomer are copolymerized while the composition of a monomer mixture comprising the aromatic vinyl monomer and the conjugated diene monomer is varied with a process of polymerization, characterized in that the copolymerization is carried out by using an organic active metal as an initiator in the presence of a polar compound in a hydrocarbon medium, while, with a progress of polymerization, (i) the ratio of the aromatic vinyl monomer within the monomer mixture is increased so that a tapered copolymer having a ratio $W_{0.6Mp}/W_{Mp}$ in the range of from 0.65 to 0.9 is produced, or (ii) the ratio of the aromatic vinyl monomer within the monomer mixture is decreased so that a tapered copolymer having a ratio $W_{0.6Mp}/W_{Mp}$ in the range of from 1.1 to 1.3 is produced, wherein Mp is molecular weight of a copolymer molecule corresponding to the peak of a molecular weight distribution curve obtained by gel permeation chromatography, $W_{Mp}$ is a weight fraction of aromatic vinyl monomer units in the copolymer molecule having a molecular weight Mp, and $W_{0.6Mp}$ is a weight fraction of aromatic vinyl monomer units in a copolymer molecule having a molecular weight of Mp×0.6.

11. The process for producing a tapered aromatic vinyl-conjugated diene copolymer rubber according to claim 10, wherein the copolymerization is carried out while (i) the ratio of the aromatic vinyl monomer within the monomer mixture is increased so that a weight fraction of aromatic vinyl monomer units in a copolymer portion produced for a duration in which a polymer production percentage varies from 0% to 40% by weight, from 50% to 60% by weight, and from 70% to 100% by weight is not larger than 20%, from 18% to 50%, and from 25% to 70%, respectively, or (ii) the ratio of the aromatic vinyl monomer within the monomer mixture is decreased so that a weight fraction of aromatic vinyl monomer units in a copolymer portion produced for a duration in which a polymer production percentage varies from 0 to 30% by weight, from 40% to 50% by weight, and from 60% to 100% by weight is from 25% to 70%, from 18% to 50%, and not larger than 20%, respectively.

12. A rubber composition characterized by comprising the tapered aromatic vinyl-conjugated diene copolymer rubber as claimed in claim 1, and at least one kind of rubber selected from the group consisting of natural rubber and synthetic rubbers.

13. The rubber composition according to claim 12, wherein the content of the tapered aromatic vinyl-conjugated diene copolymer rubber in the rubber composition is in the range of 10% to 90% by weight.

14. A rubber composition characterized by comprising the tapered aromatic vinyl-conjugated diene copolymer rubber of a coupled type as claimed in claim 5, and at least one kind of rubber selected from the group consisting of natural rubber and synthetic rubbers.

15. The rubber composition according to claim 14, wherein the content of the tapered aromatic vinyl-conjugated diene copolymer rubber of a coupled type in the rubber composition is in the range of 10% to 90% by weight.

16. The rubber composition according to claim 12, which further comprises a reinforcing agent.

17. The rubber composition according to claim 16, wherein the reinforcing agent is silica.

18. The rubber composition according to claim 17, which further comprises a silane coupling agent.

* * * * *